(12) United States Patent
Pecina

(10) Patent No.: US 11,103,929 B2
(45) Date of Patent: Aug. 31, 2021

(54) TURNING INSERT

(71) Applicant: SANDVIK INTELLECTUAL PROPERTY AB, Sandviken (SE)

(72) Inventor: Michal Pecina, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 186 days.

(21) Appl. No.: 16/310,902

(22) PCT Filed: Mar. 23, 2017

(86) PCT No.: PCT/EP2017/056901
§ 371 (c)(1),
(2) Date: Dec. 18, 2018

(87) PCT Pub. No.: WO2017/220221
PCT Pub. Date: Dec. 28, 2017

(65) Prior Publication Data
US 2019/0247929 A1 Aug. 15, 2019

(30) Foreign Application Priority Data
Jun. 20, 2016 (EP) ..................................... 16175159

(51) Int. Cl.
*B23B 27/14* (2006.01)
*B23B 27/16* (2006.01)
*B23B 27/22* (2006.01)

(52) U.S. Cl.
CPC .......... *B23B 27/141* (2013.01); *B23B 27/143* (2013.01); *B23B 27/1622* (2013.01);
(Continued)

(58) Field of Classification Search
CPC ...... B23B 2200/201; B23B 2200/3681; B23B 27/141; B23B 2260/104; B23B 27/1622;
(Continued)

(56) References Cited

U.S. PATENT DOCUMENTS 3,395,434 A * 8/1968 Wirfelt .................. C08F 4/7095
407/114
4,359,300 A * 11/1982 Hazra ................... B23B 27/143
407/114
(Continued)

FOREIGN PATENT DOCUMENTS

DE 19856931 A1 * 6/2000 ........... B23B 27/141
EP 1023961 A1 * 8/2000 ........... B23B 27/141
(Continued)

*Primary Examiner* — Sara Addisu
(74) *Attorney, Agent, or Firm* — Corinne R. Gorski

(57) ABSTRACT

A turning insert includes a top surface, an opposite bottom surface, a side surface connecting the top and bottom surfaces, and a cutting edge formed at an intersection between the top surface and the side surface. The cutting edge including a corner cutting edge, a first cutting edge, and a second cutting edge. The top surface having a first surface in the form of a depression, which borders at least a major portion of the corner cutting edge. The first and the second cutting edges subtending an angle θ which is 75-85°. At least a part of the corner cutting edge is concave in a front view.

13 Claims, 10 Drawing Sheets

(52) U.S. Cl.
CPC ... *B23B 2200/086* (2013.01); *B23B 2200/201* (2013.01); *B23B 2200/3681* (2013.01); *B23B 2260/104* (2013.01)

(58) Field of Classification Search
CPC .... B23B 2200/0423; B23B 2200/0447; B23B 2200/0471; B23B 2200/085; B23B 2200/086; B23B 27/143
See application file for complete search history.

(56) References Cited

U.S. PATENT DOCUMENTS

| | | | | |
|---|---|---|---|---|
| 4,556,345 | A * | 12/1985 | Philippi | B23B 27/1644 407/114 |
| 4,681,487 | A | 7/1987 | Pettersson | |
| 4,685,844 | A * | 8/1987 | McCreery | B23B 27/143 407/114 |
| 4,993,892 | A * | 2/1991 | Takahashi | B23B 27/065 407/114 |
| 5,000,626 | A * | 3/1991 | Bernadic | B23B 27/143 407/114 |
| 5,006,020 | A * | 4/1991 | Roos | B23B 27/145 407/113 |
| 5,011,340 | A * | 4/1991 | Pettersson | B23B 27/143 407/114 |
| 5,456,557 | A * | 10/1995 | Bernadic | B23B 27/143 407/114 |
| 5,584,616 | A * | 12/1996 | Katbi | B23B 27/143 407/114 |
| 5,741,095 | A * | 4/1998 | Charron | B23C 5/1027 407/113 |
| 6,039,515 | A * | 3/2000 | Lamberg | B23B 27/141 408/188 |
| 6,241,430 | B1 * | 6/2001 | Norstrom | B23B 27/143 407/114 |
| 6,761,510 | B2 * | 7/2004 | Kinukawa | B23B 27/145 407/113 |
| 7,524,148 | B2 * | 4/2009 | Okita | B23B 27/143 407/114 |
| 7,934,891 | B2 * | 5/2011 | Jonsson | B23B 27/1618 407/114 |
| 10,160,047 | B2 * | 12/2018 | Yamamichi | B23C 5/207 |
| 10,286,455 | B2 * | 5/2019 | Tomoda | B23B 27/22 |
| 10,335,861 | B2 * | 7/2019 | Ekden | B23B 27/141 |
| 10,486,239 | B2 * | 11/2019 | Sasaki | B23B 27/143 |
| 2002/0090272 | A1 * | 7/2002 | Waggle | B23B 27/141 407/114 |
| 2002/0098049 | A1 * | 7/2002 | Satran | B23C 5/2221 407/113 |
| 2002/0122700 | A1 * | 9/2002 | Inayama | B23B 27/045 407/117 |
| 2003/0031520 | A1 * | 2/2003 | Hintze | B23B 27/141 407/114 |
| 2006/0228179 | A1 * | 10/2006 | Alm | B23B 27/145 407/113 |
| 2007/0258778 | A1 * | 11/2007 | Waggle | B23C 5/207 407/113 |
| 2011/0229279 | A1 | 9/2011 | Kobayashi | |
| 2012/0057943 | A1 * | 3/2012 | Zastrozynski | B23C 5/202 407/30 |
| 2012/0128438 | A1 * | 5/2012 | Tanaka | B23B 27/141 407/115 |
| 2012/0230785 | A1 * | 9/2012 | Chen | B23B 27/141 407/114 |
| 2013/0272808 | A1 * | 10/2013 | Cohen | B23B 27/143 407/116 |
| 2017/0209935 | A1 * | 7/2017 | Furusawa | B23B 27/22 |
| 2020/0038963 | A1 * | 2/2020 | Jonsson | B23B 27/141 |
| 2020/0346288 | A1 * | 11/2020 | Johansson | B23B 27/141 |

FOREIGN PATENT DOCUMENTS

| | | | | |
|---|---|---|---|---|
| EP | 1226892 | A2 * | 7/2002 | ........... B23B 27/145 |
| EP | 3006140 | A1 | 4/2016 | |
| JP | 2000107911 | A | 4/2000 | |
| JP | 2007260841 | A | 10/2007 | |
| WO | 2006091141 | A1 | 8/2006 | |
| WO | WO-2013142885 | A1 * | 10/2013 | ........... B23B 27/045 |
| WO | WO-2015137133 | A1 * | 9/2015 | ........... B23B 27/143 |

* cited by examiner

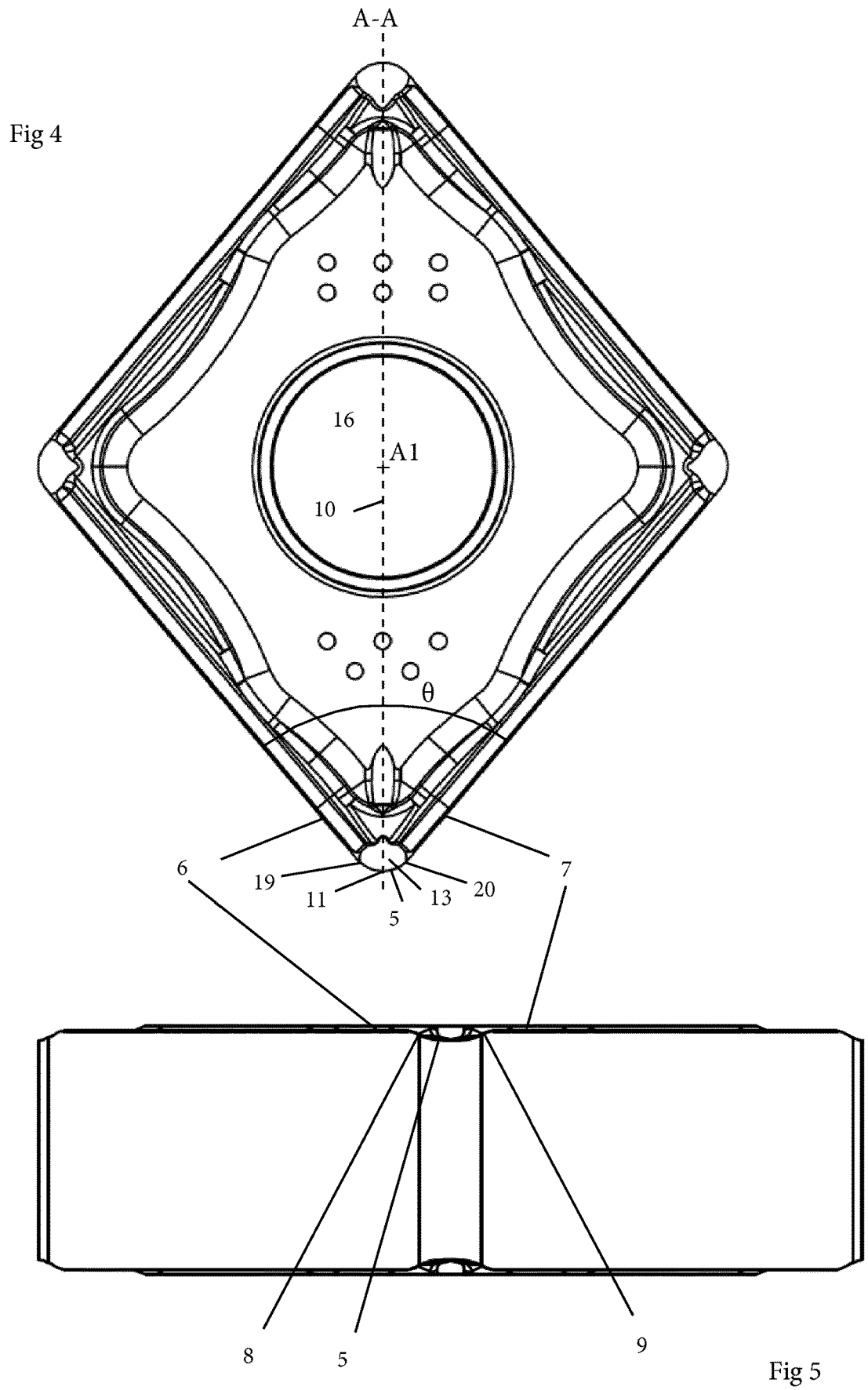

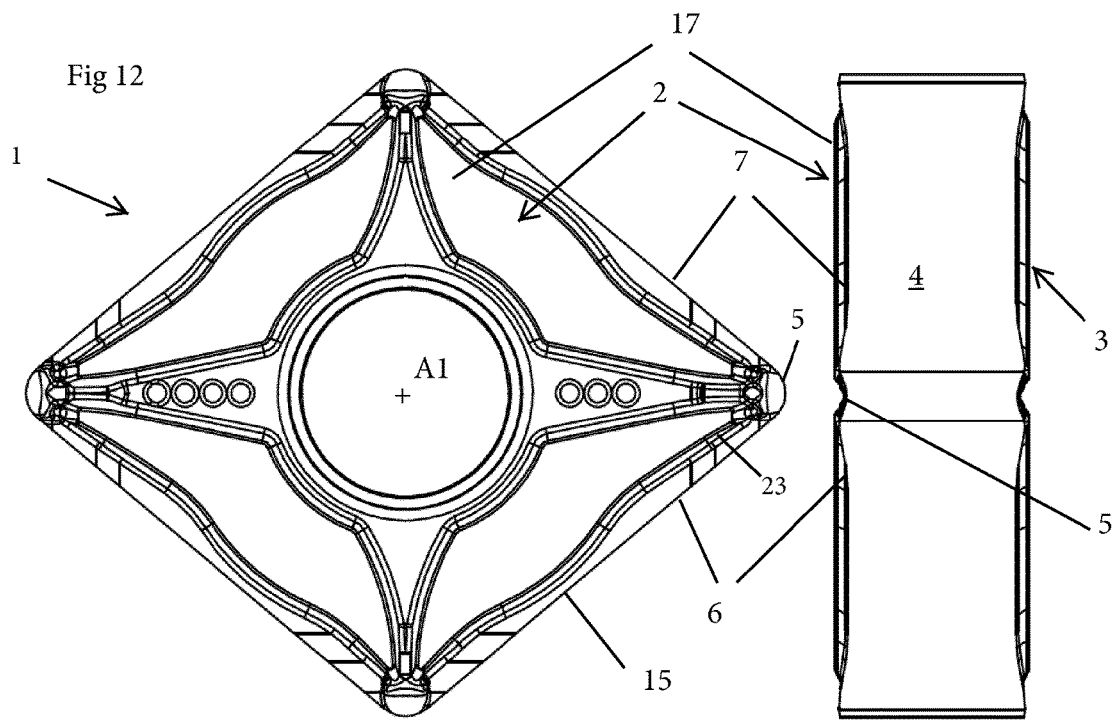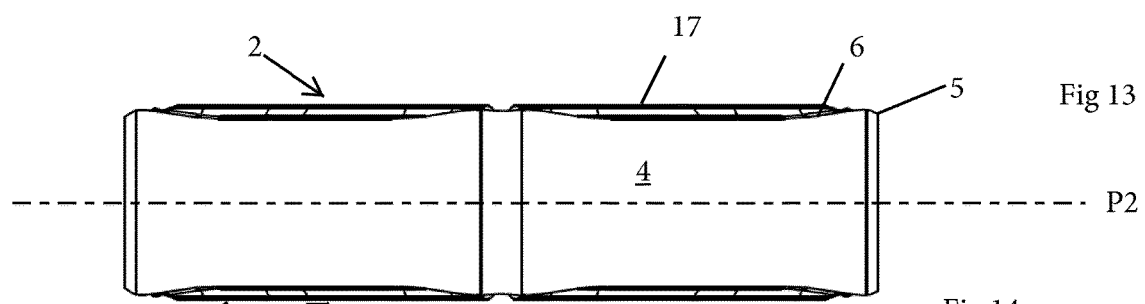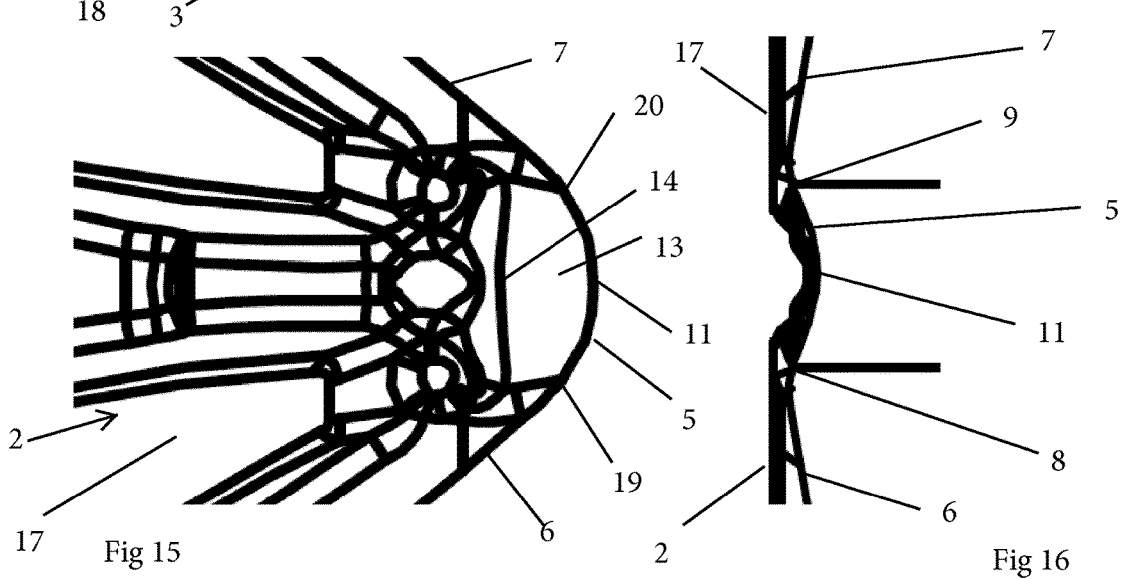

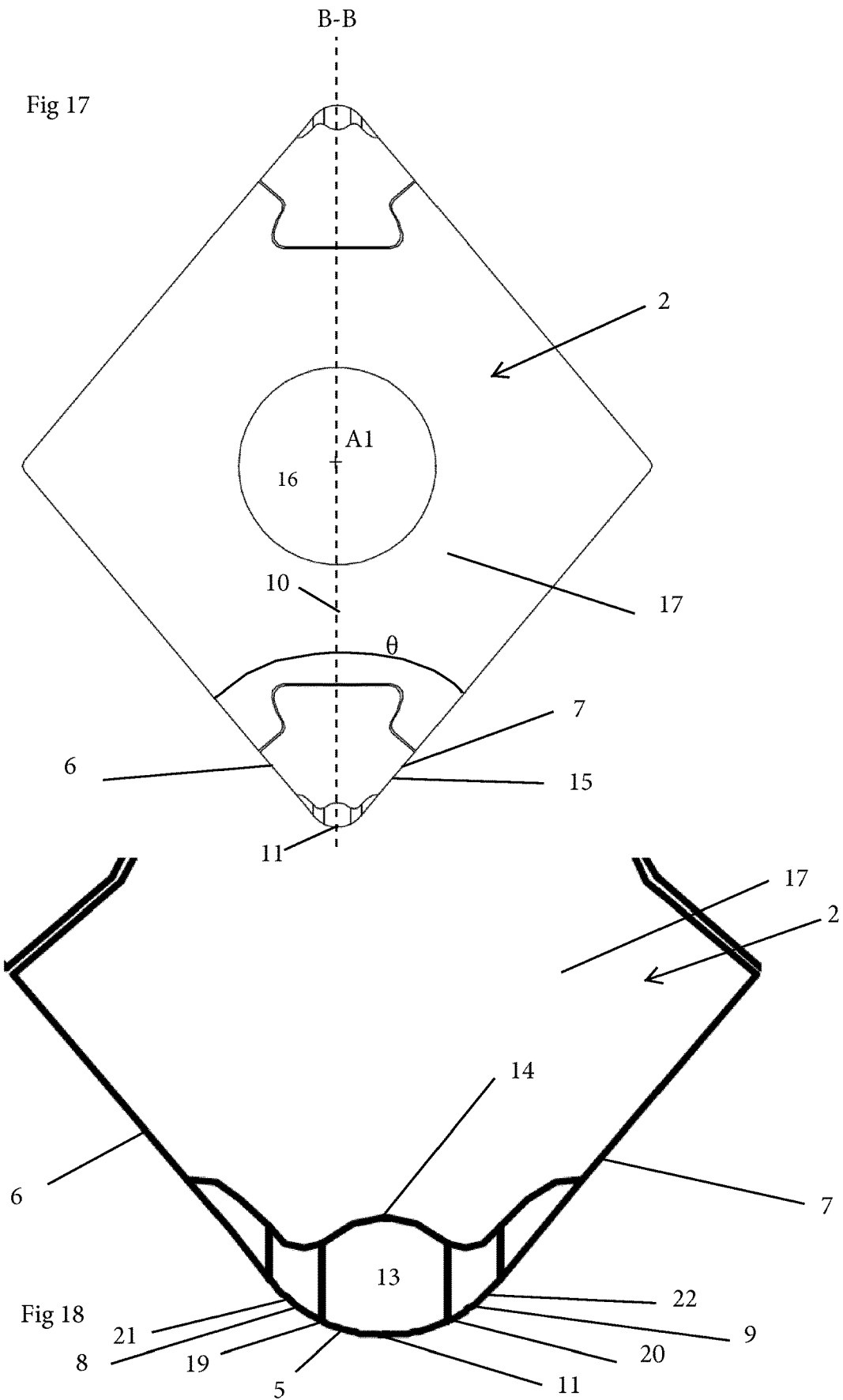

TURNING INSERT

RELATED APPLICATION DATA

This application is a § 371 National Stage Application of PCT International Application No. PCT/EP2017/056901 filed Mar. 23, 2017 and EP 16175159.9 filed Jun. 20, 2016.

TECHNICAL FIELD OF THE INVENTION

The present invention belongs to the technical field of metal cutting. More specifically the present invention belongs to the field of turning inserts used for metal cutting in machines such as computer numerical control, i.e. CNC, machines.

BACKGROUND OF THE INVENTION AND PRIOR ART

The present invention relates to a turning insert comprising a top surface, an opposite bottom surface, a side surface connecting the top and bottom surfaces, a cutting edge formed at an intersection of the top surface and the side surface, the cutting edge comprising a corner cutting edge, a first cutting edge and a second cutting edge, wherein the corner cutting edge is convex in a top view, wherein a first end of the corner cutting edge and the first cutting edge are connected at a first transition point, wherein an opposite second end of the corner cutting edge and the second cutting edge are connected at a second transition point, wherein a bisector extending equidistantly A turning insert is commonly used in metal cutting, for machining a metal work piece, which after machining is rotationally symmetrical, such as e.g. cylindrical. In turning, commonly the work piece rotates around an axis of rotation, i.e. a rotational axis. A turning insert is clamped in a turning tool, which moves in relation to the metal work piece. The moving of the turning tool is commonly in a linear motion, and is designated feed. When turning a cylindrical surface, the movement of the turning tool is in a direction which is parallel to the axis of rotation of the work piece. In such longitudinal turning, the machined surface is commonly formed by an active corner cutting edge, also known as nose cutting edge.

The chips cut from the metal work piece during a turning operation are preferably short or having a shape such that they do not affect the metal work piece, the turning tool or the turning insert in a negative way. Further, chips should be shaped such they can be handled and removed from the machine in a convenient manner.

A common problem in turning of metal is that chips are long or otherwise have a shape which is not desirable, especially when turning e.g. low carbon steels at low depth of cut, i.e. a depth of cut which is smaller than the active nose radius of the turning insert.

Commonly, attempts to solve such problems have included: a) choosing smaller nose radius, which decrease the life of the turning insert; b) choosing a higher feed, which reduces the machined surface finish; c) using high pressure coolant to break chips, which may require expensive investments; and d) modifying the top surface such that a chip breaker, spaced apart from the active nose cutting edge, improves the shape of the chip after it is generated.

Although improvements by chip breaker design, such as the turning insert known from U.S. Pat. No. 4,681,487, have been made, there is a need for further improvements.

SUMMARY OF THE INVENTION

An object of the present invention is to provide a turning insert having improved chip breaking at low cutting depth, more specifically at cutting depths lower or equal than the nose radius, when turning metals such as low carbon steels or hardened steels. A further object is to increase the tool life of the turning insert under the same conditions.

At least the main object is achieved with the initially defined turning insert, which is characterized in that the first and the second cutting edges in a top view subtending an angle θ which is 75-85°, in that at least a part of the corner cutting edge is concave in a front view, in that the first surface is a depression, in that the first surface is bordered by the cutting edge along a length defined by a first intersection point and an opposite second intersection point, in that the first and second intersection points are located on opposite sides of the bisector, and in that a shortest distance in a top view between the first and second intersection points is 75-125% of a distance in a top view between the first and second transition points.

By such turning insert, chip control is improved, especially at low depths of cut, i.e. a depth of cut which is lower than the nose radius, in longitudinal turning where the feed direction is parallel to a rotational axis of a rotating metal work piece to be machined.

Surprisingly, the inventor has found that the tool life has been improved when using such a turning insert in longitudinal turning, compared to a reference insert, when turning steel at a depth of cut which is equal to or smaller than the nose radius of the active corner cutting edge. In other words, the insert wear has been reduced. The insert wear which has been reduced is flank wear. A further reduction of insert wear, mainly a reduction of plastic deformation of the corner portion, is due to the relatively large angle θ which is 75-85°.

By such a turning insert it is possible to machining a 90° corner, i.e. a shape comprising a cylindrical surface concentric with a rotational axis of the work piece, and a flat surface perpendicular to the rotational axis of the work piece, with sufficient clearance, while having long tool life.

A turning insert is a type of cutting insert, which can be detachably mounted in an insert seat, by means of a clamping member, such as a screw or a top-clamp. The turning insert is suitable for metal cutting. The turning insert is suitable for forming a surface in a work piece, which surface is rotationally symmetrical around a rotation axis of the work piece. An example of such a surface is surface having a constant, within 0.02 mm, distance from the rotational axis of the work piece, which surface is formed by a process comprising rotation of the work piece around the rotational axis and a simultaneous movement, i.e. feed, of the turning insert in a direction parallel to the rotational axis. The turning insert is made from a hard and/or wear resistant material, such as a cemented carbide, cermet, ceramics (e.g. silicon nitride, sialon and silicon carbide), cubic boron nitride (CBN) or polycrystalline diamond (PCD).

The turning insert comprises a top surface comprising a rake face, and an opposite bottom surface comprising a support surface. A side surface, comprising a clearance surface, connects the top and bottom surfaces.

The top surface of the turning insert is preferably parallelogram-shaped or triangle-shaped in a top view.

A cutting edge is formed at a periphery of the top surface, at an intersection of or between the top surface and the side surface. The cutting edge is preferably but not necessarily circumferential. The cutting edge comprises a first cutting edge and a second cutting edge which first and second cutting edges converge towards a corner cutting edge. The first cutting edge is a main cutting edge.

The first cutting edge is ahead of the second cutting edge in the feed direction. The first and second cutting edges are preferably straight in a top view. The corner cutting edge, also known as nose cutting edge, is a surface generating cutting edge. In other words, the machined surface is formed by the corner cutting edge. At low depths of cut, i.e. at depths lower than the nose radius, only a portion of the corner cutting edge is active. The corner cutting edge is convex in a top view, preferably by having a circular arc-shape in a top view, i.e. by having a constant radius of curvature in a top view. Alternatively, the corner cutting edge may in a top view comprise a number, e.g. 3 or 5, of circular or oval arcs.

The corner cutting edge runs uninterrupted from a first end to an opposite second end. The first end of the corner cutting edge and the first cutting edge are connected at a first transition point. The second end of the corner cutting edge and the second cutting edge are connected at a second transition point.

Preferably, the corner cutting edge at the first transition point is tangent or substantially tangent to the first cutting edge in a top view, wherein the corner cutting edge at the second transition point is tangent or substantially tangent to the second cutting edge in a top view. By such a turning insert, the insert wear is further reduced at cutting depths greater than the nose radius, because the transition between the corner cutting edge and the first and second cutting edge, respectively, is smooth.

A bisector, or a bisector plane, extends equidistantly between the first and second cutting edges and intersects a mid-point of the corner cutting edge in a top view.

The first and second transition points are located on opposite sides of the bisector.

The top surface comprises a first surface, which first surface is a depression, such as e.g. a recess, a dent, an indentation, a hollow, a groove, or a chute. In other words, each point of the first surface is thus depressed or recessed or sunken relative to adjacent points of the top surface where adjacent points of the top surface are spaced apart from the first surface. The first surface is not a flat surface, in other words, the first surface is not located in a single plane.

The first surface is a chip forming surface and/or a rake face.

The first surface borders to, or is adjacent to, at least a major portion, i.e. at least 50% of the length in a top view, of the corner cutting edge. The first surface borders to the mid-point of the corner cutting edge.

The first and the second cutting edges in a top view subtend an acute angle $\theta$ which is 75-85°, preferably 78-82°.

The first and the second cutting edge converge towards the corner cutting edge. Preferably, the top surface is shaped as a parallelogram in a top view, comprising two opposite acute corners each subtending an angle $\theta$ of 78-82° in a top view and further comprising two opposite obtuse corners each subtending an angle of 98-102° in a top view.

At least a part of, preferably at least 75%, even more preferably at least 90%, of the corner cutting edge is concave in a front view. At least a part of, preferably at least 75%, even more preferably at least 90%, of the corner cutting edge is depressed, or recessed, or sunken, in relation to the first and second transition points in a front view.

The first surface extends along the cutting edge by a length defined by a first intersection point and an opposite second intersection point. In other words, the first surface borders to the cutting edge uninterrupted from a first intersection point to a second intersection point. Put differently, the cutting edge is concave in a front view from the first intersection point to the second intersection point.

In a front view, all portions of the cutting edge between the first and second intersection points are depressed, or recessed, or sunken down, relative to the first and second intersection points.

In other words, a distance between all portions of the cutting edge between the first and second intersection points to a reference plane extending equidistantly between the top and bottom surfaces is shorter than distances between the first and second intersection points, respectively, to said reference plane.

The first and second intersection points are located on opposite sides of the bisector. The first intersection point and the first transition point are located on the same side of the bisector in a top view. The second intersection point and the second transition point are located on the same side of the bisector in a top view.

A shortest distance in a top view between the first and second intersection points is 75-125% of a distance in a top view between the first and second transition points. The first intersection point and the first transition point may coincide, or may be spaced apart by a small distance in a top view, preferably less than 1 mm, even more preferably less than 0.2 mm. The second intersection point and the second transition point may coincide, or may be spaced apart by a small distance in a top view, preferably less than 1 mm, even more preferably less than 0.2 mm.

The first surface extends a length along the cutting edge which is preferably 75-125% of a length which the corner cutting edge extends along the cutting edge.

According to an embodiment, the mid-point of the corner cutting edge is the most depressed point of the corner cutting edge.

By such a turning insert, the turning insert is more suitable to be used for longitudinal turning in opposite directions.

The mid-point of the corner cutting edge is the most depressed, or most recessed, or most sunken, portion or point or part of the corner cutting edge in a front view. In other words, a distance between the mid-point of the corner cutting edge to a reference plane extending equidistantly between the top and bottom surfaces is shorter than a distance between a point of the corner cutting edge spaced apart from said mid-point to said reference plane. Preferably, the mid-point of the corner cutting edge is depressed more than 0.05 mm in relation to the highest point of the cutting edge as seen in a front view. Preferably, the mid-point of the corner cutting edge is depressed within a range of 0.10-0.25 mm in relation to the highest point of the cutting edge as seen in a front view or side view. In other words, a distance between the mid-point of the corner cutting edge to a reference plane extending equidistantly between the top and bottom surfaces is 0.10-0.25 mm shorter a distance between a highest point, in a side view or in a front view, of the cutting edge to said reference plane.

According to an embodiment, an edge angle $\alpha$ formed between the first surface and the side surface, at the mid-point of the corner cutting edge, is less than 110°, where the edge angle $\alpha$ is measured in a plane P1 comprising the bisector.

By such a turning insert, the chip breaking and/or chip control is further improved.

An edge angle $\alpha$, or an angle $\alpha$, formed between or by the first surface and the side surface, at the mid-point of the corner cutting edge, is less than 110°, and preferably more than 75°, where the edge angle $\alpha$ is measured in a plane P1 comprising the bisector and wherein said plane P1 is perpendicular to a reference plane P2, where said reference plane extends equidistantly between the top and bottom surfaces. Preferably, the corner cutting edge is made from cemented carbide, or coated cemented carbide, or cermet, or coated cermet, and the edge angle α is preferably less than 90° and preferably more than 70°.

According to an embodiment, the first surface is more depressed along the bisector than perpendicular to the bisector.

Such a turning insert is more suitable for use in opposite feed directions.

More precisely, in cross sections perpendicular to the bisector, the first surface is more depressed at points along the bisector than at points perpendicular to, or spaced apart from, the bisector.

According to an embodiment, the corner cutting edge and the first surface are symmetrically arranged or substantially symmetrically arranged relative to the bisector.

Such a turning insert is more suitable for use in opposite feed directions.

Thus, the corner cutting edge and the first surface are symmetrically arranged or substantially symmetrically arranged relative to the bisector in a top view and in a front view. Preferably, the cutting edge and the top surface is symmetrically arranged or substantially symmetrically arranged relative to the bisector in a top view and in a front view.

According to an embodiment, a distance from the first intersection point to the first transition point in a top view is less than 20% of a distance between the first and second transition points in a top view, wherein a distance from the second intersection point to the second transition point in a top view is less than 20% of a distance between the first and second transition points in a top view.

By such a turning insert, the chip breaking and/or chip control is further improved.

In a top view, a straight line distance from the first intersection point to the first transition point is zero or less than 20%, preferably less than 10%, of a straight line distance between the first and second transition points.

In a top view, a straight line distance from the second intersection point to the second transition point is zero or less than 20%, preferably less than 10%, of a straight line distance between the first and second transition points.

According to an embodiment, at least the majority of the first surface is concave as seen in cross sections in planes perpendicular to the bisector, from the mid-point of the corner cutting edge towards a first surface rear end.

By such a turning insert, the chip breaking and/or chip control is further improved.

At least the majority, i.e. more than 50%, preferably more than 80%, even more preferably 100%, of the first surface is concave as seen in cross sections in planes perpendicular to the bisector, from the mid-point of the corner cutting edge towards a first surface rear end. In a top view, the first surface rear end is opposite a front end of the first surface, where said front end is defined by extension along the cutting edge from the first intersection point to the second intersection point. The first surface rear end is preferably concave in a top view.

According to an embodiment, the first cutting edge comprises a first convex cutting edge portion adjacent to the first intersection point, wherein the second cutting edge comprises a second convex cutting edge portion adjacent to the second intersection point.

By such a turning insert, the insert wear is further reduced. The inventor has found that a smooth transitions of the cutting edge reduces the risk of insert wear, compared to a cutting edge having sharp transitions.

The first cutting edge thus comprises a first convex, in a side view, cutting edge portion adjacent to the first intersection point, The second cutting edge comprises a second convex, in a side view, cutting edge portion adjacent to the second intersection point.

In a top view, a distance from the mid-point of the corner cutting edge to the first convex cutting edge portion is greater than a distance from the mid-point of the corner cutting edge to the first intersection point.

In a top view, a distance from the mid-point of the corner cutting edge to the second convex cutting edge portion is greater than a distance from the mid-point of the corner cutting edge to the second intersection point.

Preferably, in a front view the first and second convex cutting edge portions have radii of curvature which are smaller than a radius of curvature of the corner cutting edge between the first and second intersection points.

Preferably, the first convex cutting edge portion comprises the first transition point.

Preferably, the second convex cutting edge portion comprises the second transition point.

The first and second convex cutting edge portions are connected by a concave, in a front view, cutting edge portion.

According to an embodiment, the first surface is bordered by a first surface front end defined by the cutting edge between the first intersection point and the opposite second intersection point, and an opposite first surface rear end, wherein in a top view a distance from the mid-point of the corner cutting edge to a center of the first surface rear end is 25-150% of a distance in a top view from the first intersection point to the second intersection point, wherein the corner cutting edge has a radius of curvature in top view which is 0.2-2.0 mm, wherein a distance in a top view between the mid-point of the corner cutting edge to a center of the first surface rear end is at least 25% and less than or equal to 150% of the radius of curvature of the corner cutting edge in a top view.

By such a turning insert, the chip breaking and/or chip control is further improved.

The first surface is bordered by, i.e. extends between, a first surface front end, defined by the cutting edge between the first intersection point and the opposite second intersection point, and an opposite first surface rear end.

In a top view, a distance from the mid-point of the corner cutting edge to a center of the first surface rear end, i.e. a point of the first surface rear end intersecting the bisector in a top view, is 25-150% of a distance in a top view from the first intersection point to the second intersection point.

The corner cutting edge has a radius of curvature in top view which is 0.2-2.0 mm, preferably 0.4-1.2 mm.

A distance in a top view between the mid-point of the corner cutting edge to a center of the first surface rear end, i.e. a point of the first surface rear end intersecting the bisector in a top view, is at least 25% and less or equal than 150% of the radius of curvature of the corner cutting edge in a top view.

According to an embodiment, the corner cutting edge has a constant or substantially constant radius of curvature in a top view, wherein said radius of curvature is 0.2-2.0 mm, wherein in a front view, at least a portion of the corner cutting edge has a constant or substantially constant second radius of curvature around a longitudinal axis A2, wherein the second radius of curvature is 150-250% of the radius of curvature of the corner cutting edge in a top view, wherein the bisector and the longitudinal axis A2 are located in a common plane P1, wherein the bisector and the longitudinal axis A2 coincide in a top view, wherein a reference plane P2 extends equidistantly between the top and bottom surfaces, wherein the top surface comprises a first flat surface extending parallel to the reference plane P2, wherein the mid-point of the corner cutting edge and the longitudinal axis A2 are located on opposite sides of a plane containing the first flat surface.

By such a turning insert, the chip control is further improved.

The corner cutting edge has a constant or substantially constant radius of curvature, 0.2-2.0 mm, in a top view, around an axis which intersects and is perpendicular to the bisector.

In a front view, the corner cutting edge or at least a portion, preferably at least 80%, of the corner cutting edge as a constant or substantially constant second radius of curvature around a longitudinal axis A2.

The bisector and the longitudinal axis A2 are parallel.

The top surface comprises a first flat surface parallel to the reference plane P2, which first flat surface preferably is spaced apart from the cutting edge.

According to an embodiment, a reference plane P2 extends equidistantly between the top and bottom surfaces, wherein a shortest distance from the mid-point of the corner cutting edge to the reference plane P2 is less than a shortest distance from the first transition point to the reference plane P2, wherein a shortest distance from the mid-point of the corner cutting edge to the reference plane P2 is less than a shortest distance from the second transition point to the reference plane P2.

By such a turning insert, the chip control is further improved.

A reference plane P2 extends equidistantly between, i.e. at equal distances from, the top and bottom surfaces.

A shortest distance from the mid-point of the corner cutting edge to the reference plane P2 is less or shorter, preferably 0.02-0.20 mm shorter, than a shortest distance from the first transition point to the reference plane P2, measured perpendicular to the reference plane P2.

A shortest distance from the mid-point of the corner cutting edge to the reference plane P2 is less or shorter, preferably 0.02-0.20 mm shorter, than a shortest distance from the second transition point to the reference plane P2, measured perpendicular to the reference plane P2.

According to an embodiment, an edge angle $\alpha$ formed between the first surface and the side surface at the mid-point of the corner cutting edge, is 65-95°, where the edge angle $\alpha$ is measured in a plane comprising the bisector and intersecting the side surface, wherein the top surface comprises two identical first surfaces, wherein the first surface is concave when viewed in a plane comprising the bisector, wherein the turning insert comprises at least 99% cemented carbide or at least 99% cermet, and wherein the first surface is formed by pressing and sintering. For example, the top surface preferably comprise two identical but mirror imaged first surfaces, where the top surface is 180° symmetrical in a top view. Alternatively, the top surface may comprise three identical first surfaces, where the top surface is 120° symmetrical in a top view.

By such an insert, the shape of the insert, or at least the shape of the top surface of the insert, can be made by pressing, i.e. compactation of powder comprising preferably Tungsten carbide and Cobalt, and subsequent sintering, without a grinding operation.

An edge angle $\alpha$, or an angle $\alpha$, formed between the first surface and the side surface, at the mid-point of the corner cutting edge, is 65-95°, preferably 70-90°, where the edge angle $\alpha$ is measured in a plane comprising the bisector and intersecting the side surface. The first surface is concave when viewed in a plane comprising the bisector. Preferably, the most depressed portion of the first surface along the bisector is between and spaced apart from the mid-point of the corner cutting edge and an opposite rear end of the first surface.

The turning insert comprises at least 99%, preferably 100%, cemented carbide, preferably a mixture of tungsten carbide and cobalt which preferably is coated with a wear resistant film, or at least 99%, preferably 100%, cermet which may be coated with a wear resistant film. Said wear resistant films preferably comprises titanium carbide, titanium nitride, titanium carbide nitride, titanium aluminum nitride or aluminum oxide.

The shape of the first surface is formed solely by pressing, i.e. pressing of cemented carbide powder into a body, and subsequent sintering such that the porosity of the body is reduced, without any subsequent grinding. Thus, the first surface is free from lines from grinding.

According to an embodiment, the turning insert in a top view is shaped as a parallelogram or a rhomboid or a polygon, wherein top surface in a top view comprises two or three acute angled corners, wherein the top surface and the bottom surface are identical or substantially identical, wherein a central through hole intersects the top surface and the bottom surface, wherein the central through hole extends along a center axis A1 of the turning insert, wherein the first and second cutting edges are straight or substantially straight in a top view, wherein a reference plane P2 extends equidistantly between the top and bottom surfaces, wherein the center axis A1 of the turning insert is perpendicular to the reference plane P2, wherein the first and second cutting edges extends to transition points formed at adjacent corners, wherein the top surface comprises a first flat surface parallel to the reference plane P2, wherein the bottom surface comprises a second flat surface parallel to the reference plane P2, wherein a shortest distance from the reference plane P2 to the first flat surface is greater than a shortest distance from the reference plane P2 to the cutting edge, wherein the corner cutting edge in a top view is shaped as an arc of a circle with a radius of 0.2-2.0 mm or substantially shaped as an arc of a circle with a radius of 0.2-2.0 mm, wherein a shortest distance from the center axis A1 of the turning insert to the mid-point of the corner cutting edge is greater than a shortest distance from the center axis A1 of the turning insert to the first cutting edge, wherein a shortest distance from the center axis A1 of the turning insert to the mid-point of the corner cutting edge is greater than a shortest distance from the center axis A1 of the turning insert to the second cutting edge, wherein the top surface comprises an inclined surface, wherein the first surface and the inclined surface are spaced apart, wherein at least a portion of the inclined surface is elevated in relation to the cutting edge, wherein a distance from the corner cutting edge to a bottom portion of the inclined surface is shorter than a distance from the corner cutting edge to a top portion of the inclined surface, wherein the turning insert, including the first surface, is made from cemented carbide or cermet.

By such a turning insert, the insert can be indexed in a number of positions in a seat, whereby the insert can be used for a longer period of time. By such a turning insert, the turning insert can comprise more than one corner cutting edge and more than one adjacent first surface in the form of a depression.

The turning insert in a top view has a shape which is that of a parallelogram or a rhomboid or a triangle or a polygonal.

The top surface in a top view comprises two or three acute corners, where identical first surfaces are intersecting each acute corner.

The top surface and the bottom surface are identical or substantially identical in a top view and a bottom view, respectively.

A central through hole, for a screw, intersects, or runs between, the top surface and the bottom surface.

The central through hole extends along, and is concentric with, a center axis A1 of the turning insert.

In a top view, the mid-points of the corner cutting edges are the most distal points of the cutting edge in relation to the center axis A1 of the turning insert.

The first and second cutting edges are straight or substantially straight in a top view.

A reference plane P2 extends equidistantly between the top and bottom surfaces.

The center axis A1 of the turning insert is perpendicular to the reference plane P2.

The first and second cutting edges extend, preferably linearly or straight in a top view, to transition points formed at adjacent corners.

The top surface comprises a first flat surface parallel to the reference plane P2.

The bottom surface comprises a second flat surface parallel to the reference plane, which second flat surface is a support surface.

A shortest or perpendicular distance from the reference plane P2 to the first flat surface is greater than a shortest or perpendicular distance from the reference plane P2 to all portions of the cutting edge.

The corner cutting edge in a top view is shaped as an arc of a circle, or a circular arc, with a radius of curvature of 0.2-2.0 mm or is substantially shaped as an arc of a circle, or a circular arc, with a radius of 0.2-2.0 mm. Said arc in a top view preferably subtending an angle less than 90°, preferably 75-85°.

In a top view, a shortest distance from the center axis A1 of the turning insert to the mid-point of the corner cutting edge is greater than a shortest distance from the center axis A1 of the turning insert to the first cutting edge and the second edge, respectively. The top surface comprises an inclined surface, which inclined surface is a chip forming surface or chip directing surface, or is an auxiliary chip forming surface or an auxiliary chip directing surface.

The inclined surface is preferably inclined with an angle 5-30° relative to the reference plane.

The inclined surface is preferably facing the corner cutting edge.

The first surface and the inclined surface are spaced apart, preferably by a distance 0.5-4 mm.

At least a portion of the inclined surface is elevated in relation to all parts of the cutting edge. In other words, a distance from the reference plane P2 to at least a portion of the inclined surface is greater than a distance from the reference plane P2 to any part of the cutting edge.

The inclined surface preferably borders to the first flat surface.

A distance from the corner cutting edge to a bottom, or lower, portion of the inclined surface is shorter than a distance from the corner cutting edge to a top, or higher, portion of the inclined surface. In other words, the inclined surface is facing the corner cutting edge.

The turning insert, including the first surface, is preferably made from cemented carbide or cermet.

According to an embodiment, the first surface is a chute, wherein the chute extends along the bisector from a center of a rear end of the first surface to the mid-point of the corner cutting edge, wherein the chute is U-shaped in cross sections in planes perpendicular to the bisector, wherein an edge angle α formed between the first surface and the side surface, at the mid-point of the corner cutting edge, is 90-125°, where the edge angle α is measured in a plane comprising the bisector, wherein the first surface is formed in a material comprising cubic boron nitride.

By such a turning insert, hardened steel can be successfully machined.

The first surface is a chute, or a groove, which extends along the bisector from a center of a rear end of the first surface, i.e. a rear end of the chute or groove, to the mid-point of the corner cutting edge. In other words, a bottom of the chute or the groove has an extension or direction which coincides with the bisector, in a top view.

The chute is constantly, i.e. uniformly, U-shaped, or constantly, i.e. uniformly, concave, in cross sections in planes perpendicular to the bisector.

The bottom of the chute is preferably straight or linear when viewed in a plane comprising the bisector.

An edge angle α formed between the first surface and the side surface, at the mid-point of the corner cutting edge, is 90-125°, preferably 95-119°, even more preferably 100-115°, where the edge angle is measured in a plane comprising the bisector.

The first surface is formed in a material comprising cubic boron nitride. Preferably, the turning insert comprises a cubic boron nitride body permanently joined or connected, e.g. by means of a brazing or joint, to a cemented carbide body. Preferably, the cubic boron nitride body comprises the corner cutting edge, the first and second transition points, and the first and second intersection points.

The chute is preferably formed by removal by a laser beam. Alternatively, the chute is formed by a grinding process, preferably by a grinding wheel having an external cross section shape corresponding to the shape of cross sections of the chute. In such case, the chute preferably comprises grinding lines extending at least mainly in directions parallel to the bisector.

According to an embodiment, a turning tool comprises a tool body and a turning insert according to any aspect or embodiment disclosed herein, wherein the tool body comprises a seat in which the turning insert is mountable, wherein the tool body comprises a front end, a rear end, and a longitudinal axis A3 intersecting the front and the rear end, wherein the bisector intersecting the mid-point of the active corner cutting edge in a top view forms an angle of 40-50° relative to the longitudinal axis A3 of the tool body.

By such a turning tool, longitudinal turning can be performed having improved chip control.

The tool body is preferably made at least partly from a softer material than the turning insert, preferably steel. The tool body comprises a seat or an insert seat or an insert pocket in which the turning insert is mountable by clamping means such as a screw or a clamp. The tool body comprises a front end, a rear end, and a longitudinal axis A3 intersecting the front and the rear end. The front end comprises the seat. The rear end of the tool body is suitable to be clamped in or coupled to a machine tool such as a computer numerical control (CNC) lathe. The tool body may in a cross section perpendicular to the longitudinal axis A3 have a square or rectangular shape, e.g. the shape of a square where the sides of the square having a length of 25 mm. Alternatively, the rear end of the tool body my comprise a coupling end which is substantially rotationally symmetrical around the longitudinal axis A3, such as the coupling end according to ISO/DIS 26623 standard, e.g. Coromant Capto. The longitudinal axis A3 is preferably arranged perpendicular to a rotational axis A4 of the metal work piece during machining. The bisector intersecting the mid-point of the active corner cutting edge, i.e. the corner cutting edge which is at the greatest distance from the rear end of the tool body, in a top view, i.e. where the top surface of the turning insert is facing the viewer, forms an angle of 40-50° relative to the longitudinal axis A3 of the tool body.

When the turning insert is mounted in the seat of the tool body, the first cutting edge is arranged to form an entering angle, i.e. an angle between the feed direction and the first cutting edge, of 92-98°. The second cutting edge is arranged to form a clearance angle 2-8°.

When a corner cutting edge adjacent to the top surface of the turning insert is active, the bottom surface is a seating surface. In other words, the bottom surface, preferably the second flat surface, is in contact with the seat of the tool body.

DESCRIPTION OF THE DRAWINGS

The present invention will now be explained in more detail by a description of different embodiments of the invention and by reference to the accompanying drawings.

FIG. 4 is a top view of the turning insert in FIG. 1.

FIG. 5 is a front view of the turning insert in FIG. 1.

FIG. 12 is a top view of a turning insert according to a second embodiment.

FIG. 13 is a first side view of the turning insert in FIG. 12.

FIG. 14 is a second side view of the turning insert in FIG. 12.

FIG. 15 is a detailed view the right-hand portion of FIG. 12.

FIG. 16 is a detailed view the center left-hand portion of FIG. 13.

FIG. 17 is a top view of a turning insert according to a third embodiment.

FIG. 18 is a detailed view of the bottom portion in FIG. 17.

All turning insert drawings or figures have been drawn to scale.

DETAILED DESCRIPTION OF EMBODIMENTS OF THE INVENTION

Figure 6:
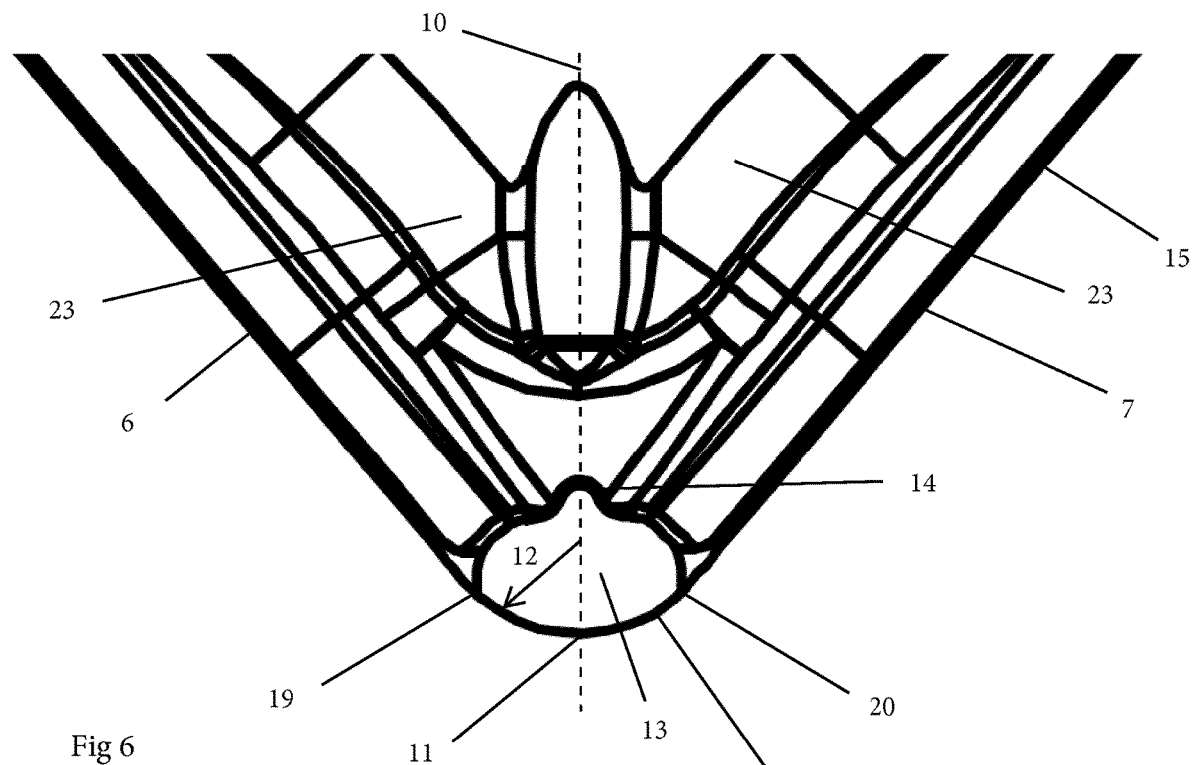
FIG. 6 is a detailed view of the bottom portion in FIG. 4.
Figure 7:
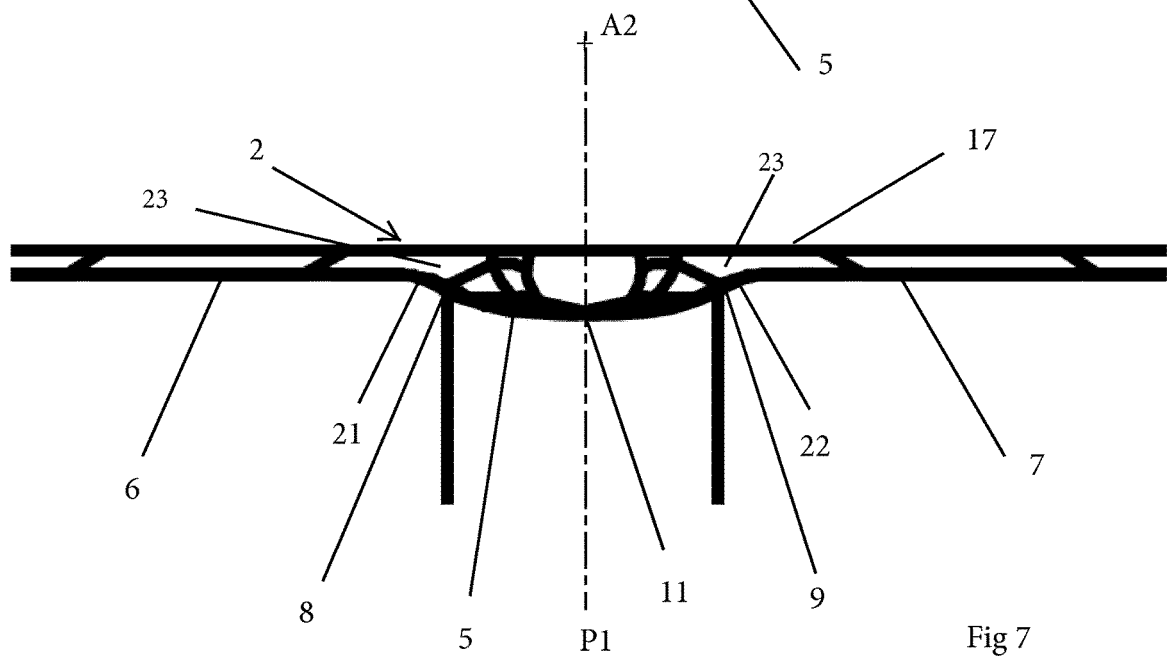
FIG. 7 is a detailed view of the center upper portion in FIG. 5.
Figure 8:
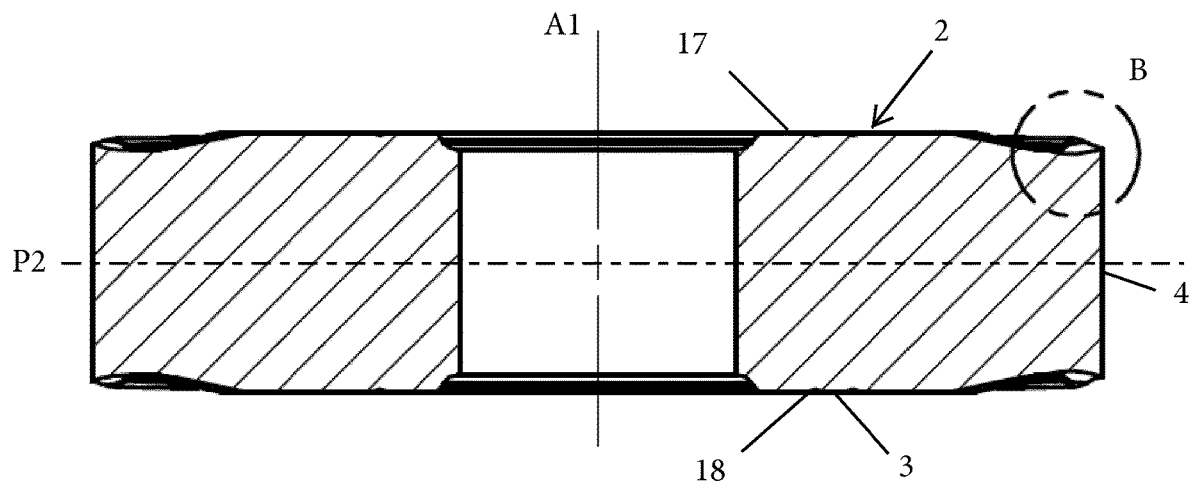
FIG. 8 is a view of cross section A-A in FIG. 4.

Reference is made to FIGS. 1-11, which show a turning insert 1 according to a first embodiment. The turning insert 1 has the dimension or general shape of the type commonly known as CNMG 120408. The turning insert 1 comprises a top surface 2, an opposite bottom surface 3, a circumferential side surface 4 connecting the top and bottom surfaces 2, 3 and a circumferential cutting edge 15 formed at an intersection of, or between, the top surface 2 and the side surface 4. The side surface 4 is a clearance surface. As seen in FIG. 8, a reference plane P2 extends equidistantly between the top and bottom surfaces 2, 3. The top surface 2 comprises a first flat surface 17 parallel to the reference plane P2, and the bottom surface 3 comprises a second flat surface 18 parallel to the reference plane P2. When a cutting edge 15 adjacent to the top surface 2 is active, the second flat surface 18 is a seating surface when the turning insert is mounted in a seat formed in a tool body not shown.

The top surface 2 and the bottom surface 3 are identical. A central through hole 16, suitable for clamping means not shown such as a screw or a clamp, extends along a center axis A1 of the turning insert 1, intersects the top surface 2 and the bottom surface 3. The center axis A1 of the turning insert 1 is perpendicular to the reference plane P2. A shortest distance from the reference plane P2 to the first flat surface 17 is greater than a shortest distance from the reference plane P2 to all parts of the cutting edge 15. The first flat surface is spaced apart from the cutting edge 15.

The cutting edge 15 comprises a corner cutting edge 5, a first cutting edge 6 and a second cutting edge 7. A first end of the corner cutting edge 5 and the first cutting edge 6 are connected at a first transition point 8, and an opposite second end of the corner cutting edge 5 and the second cutting edge 7 are connected at a second transition point 9. As can be seen in e.g. FIG. 4, the first and second cutting edges 6, 7 are straight or substantially straight in a top view. The first and second cutting edges 6, 7 extend to transition points formed at adjacent obtuse corners, at which respective obtuse corners a convex corner cutting edge is formed. The corner cutting edge 5 is convex in a top view. As seen in e.g. FIG. 4, a bisector 10 extending equidistantly between the first and second cutting edges 6, 7 intersects a mid-point 11 of the corner cutting edge 5 in a top view.

The corner cutting edge 5 has a constant or substantially constant radius of curvature in a top view, said radius of curvature is 0.2-2.0 mm. As seen in FIG. 6, the corner cutting edge 5 in a top view is shaped as an arc of a circle with a radius 12 of 0.8 mm.

The corner cutting edge 5 at the first transition point 8 is tangent to the first cutting edge 6 in a top view, and the corner cutting edge 5 at the second transition point 9 is tangent to the second cutting edge 7 in a top view. As best seen in FIG. 5, at least 90% of the corner cutting edge 5 is concave in a front view. As best seen in FIG. 7, the mid-point 11 of the corner cutting edge 5 is the most depressed portion of the corner cutting edge 5. In a front view, seen in FIG. 7, at least 90% of the corner cutting edge 5 has a constant or substantially constant second radius of curvature of 1.6 mm around a longitudinal axis A2. The bisector 10 and the longitudinal axis A2 are located in a common plane P1, seen in FIG. 7. The bisector 10 and the longitudinal axis A2 which both are perpendicular to the center axis A1 of the turning insert 1 coincide in a top view. As can be seen in e.g. FIG. 4, the mid-point 11 of the corner cutting edge 5 of the acute corner of the turning insert 1 in a top view is the part of the cutting edge 15 which is positioned at the greatest distance from the center axis A1 of the turning insert 1. As seen in FIG. 7, the mid-point 11 of the corner cutting edge 5 and the longitudinal axis A2 are located on opposite sides of a plane comprising the first flat surface 17. A distance from the mid-point 11 of the corner cutting edge 5 to the reference plane P2 is shorter than a distance from the first transition point 8 to the reference plane P2. A distance from the mid-point 11 of the corner cutting edge 5 to the reference plane P2 is shorter than a distance from the second transition point 9 to the reference plane P2.

The top surface 2 comprises a first surface 13 in the form of a depression, which borders to at least a major portion, or to at least 75%, of the corner cutting edge 5.

As can be seen in e.g. FIG. 6, the first surface 13 extends along the cutting edge 15 by a length defined by a first intersection point 19 and an opposite second intersection point 20, and the first and second intersection points 19, 20 are located on opposite sides of the bisector 10.

The first surface 13 is more depressed along the bisector 10 than perpendicular to the bisector 10.

At least the majority of the first surface 13 is concave as seen in cross sections in planes perpendicular to the bisector 10, from the mid-point 11 of the corner cutting edge 5 towards a first surface 13 rear end 14. Thus, the first surface 13 is not a flat surface. In other words, the first surface 13 is not a surface which is located in a singular plane. The first surface 13 extends between a first surface front end defined by the cutting edge 15 between the first intersection point 19 and the opposite second intersection point 20, and an opposite first surface rear end 14. Seen in e.g. FIG. 6, in a top view a distance from the mid-point 11 of the corner cutting edge 5 to a center of the first surface rear end 14 is 25-150%, in the first embodiment 80-120%, of a distance in a top view from the first intersection point 19 to the second intersection point 20.

As seen in e.g. FIG. 6, a distance in a top view between the mid-point 11 of the corner cutting edge 5 to a center of the first surface rear end 14 is at least 25% and less than or equal to 150% of the radius of curvature of the corner cutting edge 5 in a top view.

As can be seen in e.g. FIG. 6, the top surface 2 of the turning insert 1, including the corner cutting edge 5 and the first surface 13, is symmetrically arranged relative to the bisector 10.

Figure 11:
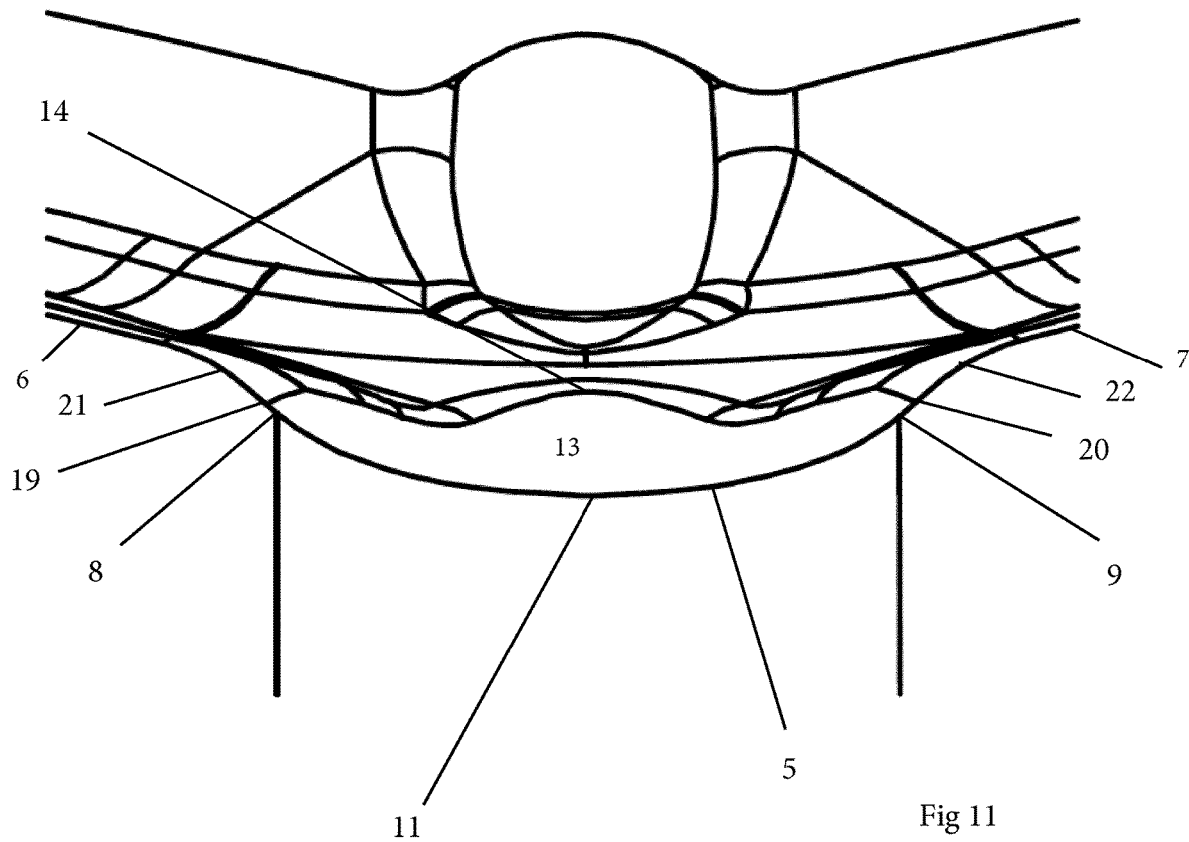
FIG. 11 is a detailed view of section C in FIG. 10.
Figure 19:
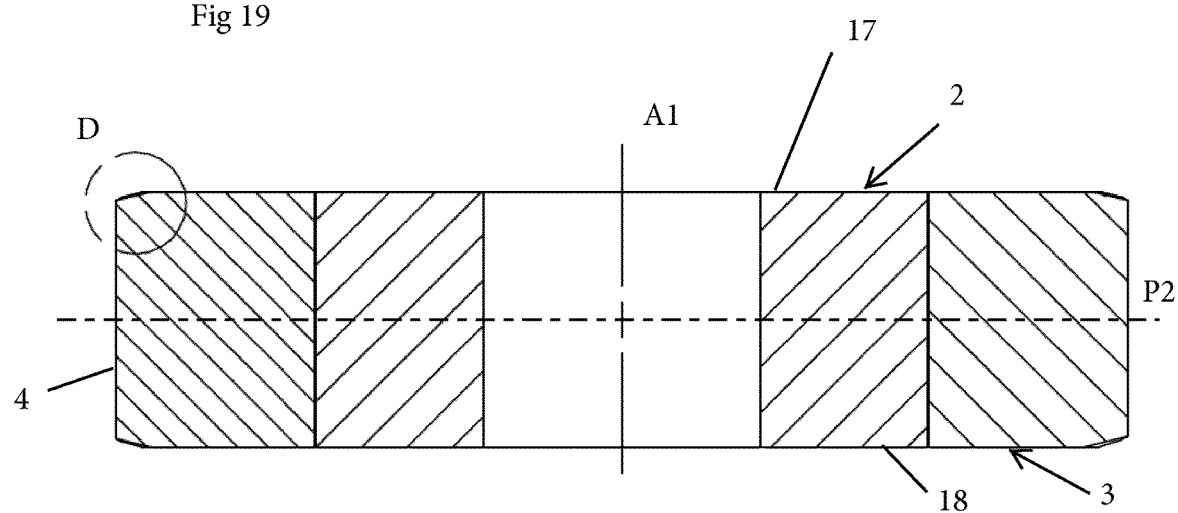
FIG. 19 is a view of cross section B-B in FIG. 17.

A distance from the first intersection point 19 to the first transition point 8 in a top view is less than 20% of a distance between the first and second transition points 8, 9 in a top view. A distance from the second intersection point 20 to the second transition point 9 in a top view is less than 20% of a distance between the first and second transition points 8, 9 in a top view. In the first embodiment, as seen in FIG. 11, the first transition point 8 and the first intersection point 19 are spaced apart by a relatively small distance, less than 0.1 mm. In the first embodiment, the second transition point 9 and the first intersection point 20 are spaced apart by a relatively small distance, less than 0.1 mm.

In a top view, as seen in FIG. 4, the first and the second cutting edges 6, 7 subtend an angle θ which is 80°.

A shortest distance in a top view between the first and second intersection points 19, 20 is 75-125% of a distance in a top view between the first and second transition points 8, 9.

Figure 1:
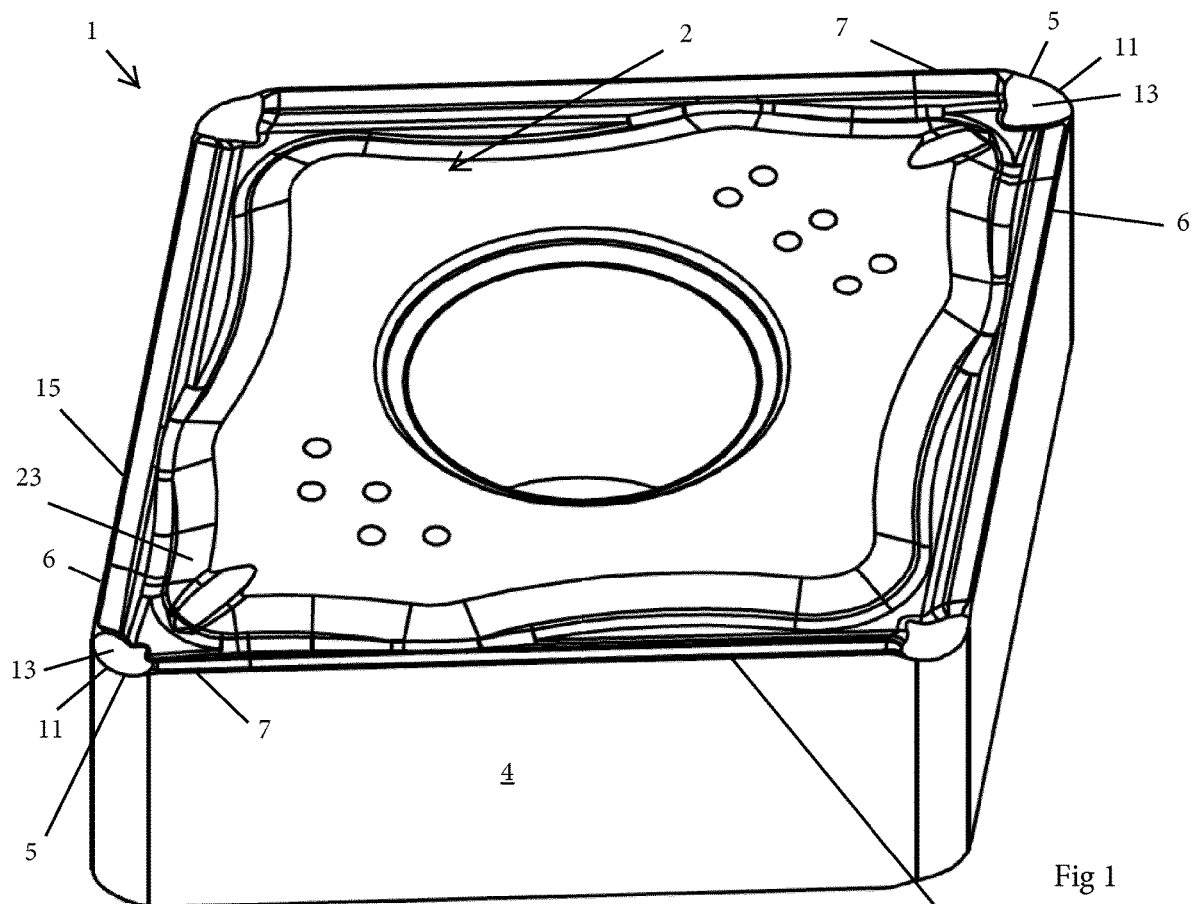
FIG. 1 is a perspective view of a turning insert according to a first embodiment.
Figure 2:
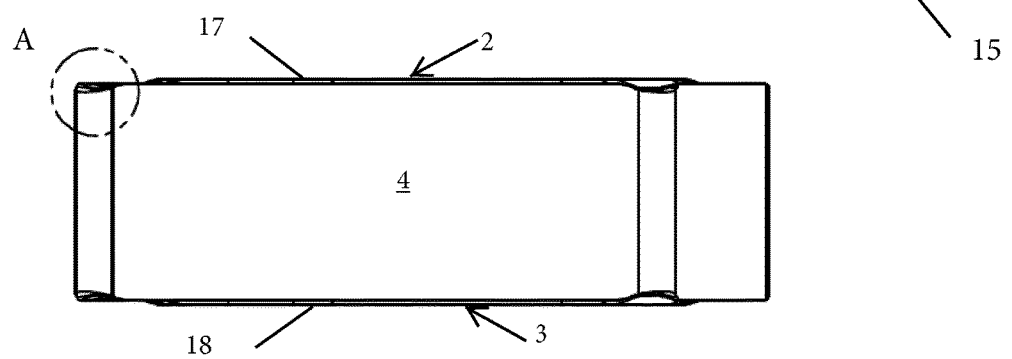
FIG. 2 is a side view of the turning insert in FIG. 1.
Figure 3:
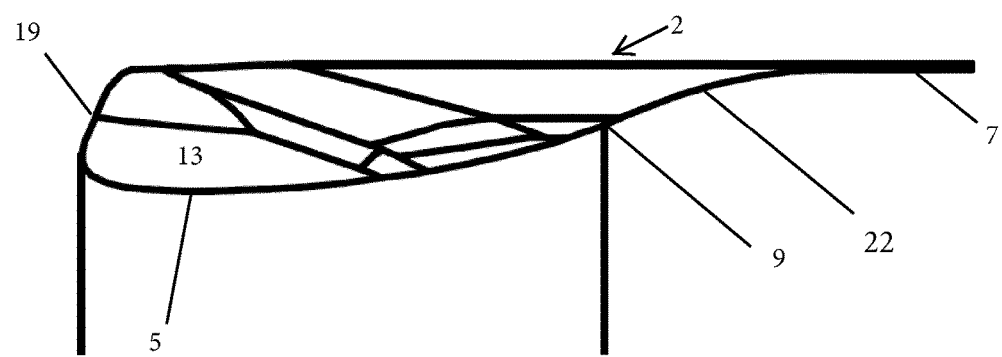
FIG. 3 is a detailed view of section A in FIG. 2.

In the first embodiment, as best seen in FIGS. 1 and 4, the top surface 2 comprises two diametrically opposite 80° corners, in a top view, where each 80° corner comprises a corner cutting edge 5 and an adjacent first surface 13 in the form of a depression. In the first embodiment, the opposite first surfaces 13 are not identical, although they may be identical. The turning insert 1 according to the first embodiment comprises, as seen in FIGS. 1 and 4, two opposite 100° corners, in a top view, where each 100° corner comprises a corner cutting edge and an adjacent depression, although this is not necessary.

Figure 9:
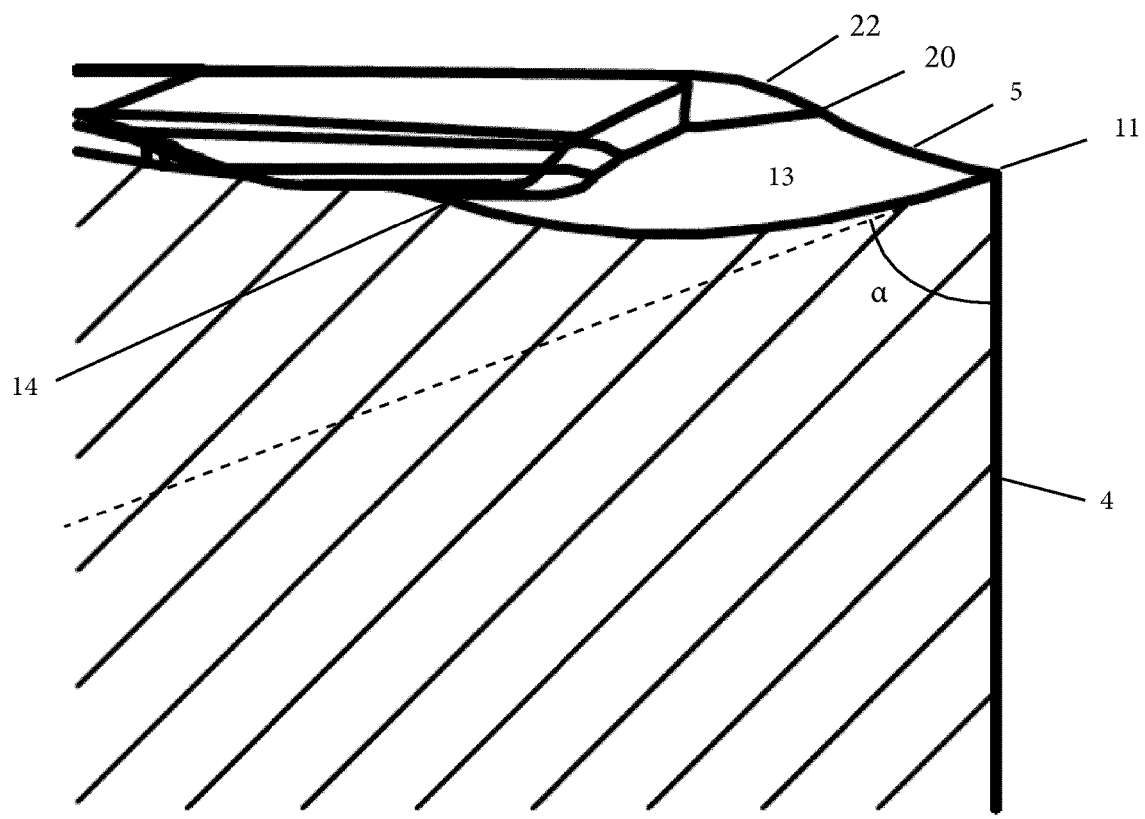
FIG. 9 is a detailed view of section B in FIG. 8.
Figure 10:
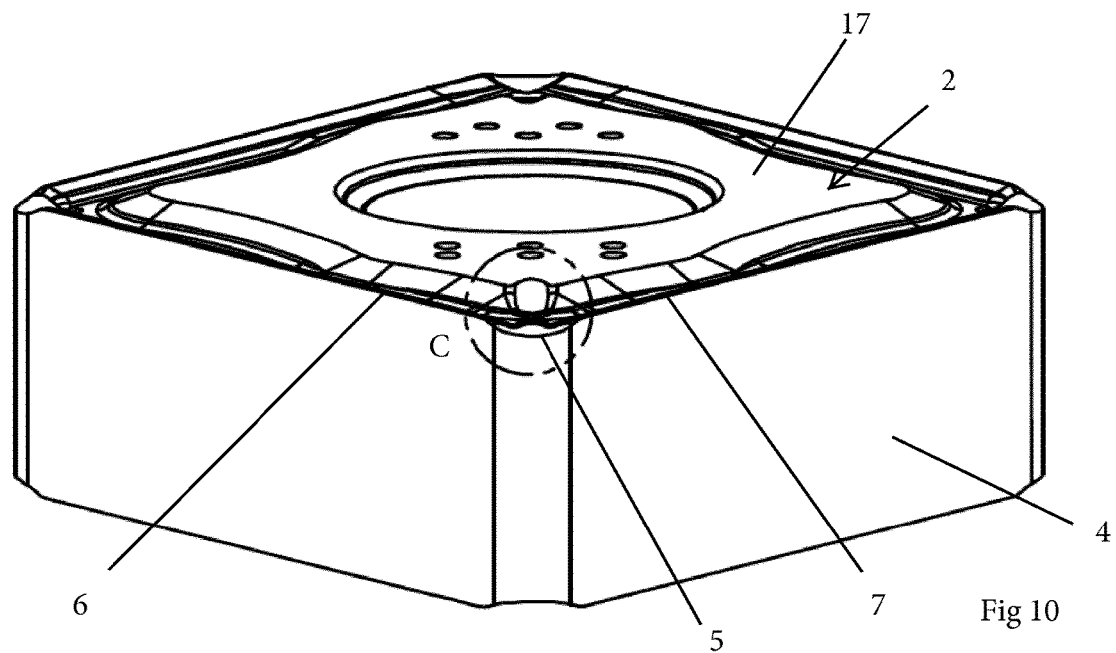
FIG. 10 is a perspective view of the turning insert in FIG. 1.

As is shown in FIG. 9, an edge angle α formed between the first surface 13 and the side surface 4, at the mid-point 11 of the corner cutting edge 5, is less than 110°, in FIG. 9 the edge angle α is 65°-75°. The edge angle α is measured in a plane P1 comprising the bisector 10 and the center axis A1 of the turning insert 1, and intersecting the side surface 4. The edge angle α at the corner cutting edge 5, in planes perpendicular to the corner cutting edge 5, between the first and second intersection points 19, 20 is 65°-90°. As seen in FIG. 9, the first surface 13 is concave as viewed in plane P1, such that a deepest, lowest, or most depressed point of the first surface 13, along the bisector 10, is between and spaced apart from both the mid-point 5 of the corner cutting edge 5 and the rear end 14 of the first surface 13.

As best seen in FIG. 7, the first cutting edge 6 comprises a first convex cutting edge portion 21 adjacent to the first intersection point 19, and the second cutting edge 7 comprises a second convex cutting edge portion 22 adjacent to the second intersection point 20. As can be seen in e.g. FIG. 5, the first and second cutting edges 6, 7 are substantially, apart from at least parts of the first and second convex cutting edge portions 21, 22, located in a common plane, which common plane is parallel to the reference plane P2.

Seen in e.g. FIG. 1, the top surface 2 comprises an inclined surface 23. The inclined surface 23 is adjacent to and inclined, preferably in the range of 5-30°, in relation to the first flat surface 17. The inclined surface 23 comprises chip breaking means or chip forming means, preferably in the form of a chip breaker wall. The first surface 13 and the inclined surface 23 are spaced apart. At least a portion of the inclined surface 23 is elevated in relation to the cutting edge 15. A distance from the corner cutting edge 5 to a bottom portion of the inclined surface 23 is shorter than a distance from the corner cutting edge 5 to a top portion of the inclined surface 23.

The turning insert 1, including the first surface 13, is made from cemented carbide or cermet. In other words, the turning insert 1 comprises at least 99% cemented carbide or at least 99% cermet. The turning insert 1, including the first surface 13 is formed by pressing and sintering. Alternatively, some surfaces, such as the second flat surface 18 and/or the side surface 4 may be formed by a subsequent grinding operation.

Reference is now made to FIGS. 12-16, which show a turning insert 1 according to a second embodiment. The turning insert 1 according to the second embodiment differs from the turning insert 1 according to the first embodiment in that the top surface 2 comprise four first flat surfaces 17, which are situated in a common plane parallel to the reference plane P2. In a corresponding manner, the bottom surface comprises four second flat surfaces 18, which are situated in a common plane parallel to the reference plane P2. Further, as best seen in FIG. 15, the shape of first surface 13 is different compared to the first surface 13 of the turning insert 1 according to the first embodiment. More specifically, in the turning insert 1 according to the second embodiment, the distance in a top view from the mid-point 11 of the corner cutting edge to the rear end 14 of the first surface is relatively shorter. Seen in e.g. FIG. 15, in a top view a distance from the mid-point 11 of the corner cutting edge 5 to a center of the first surface rear end 14 is 40-60% of a distance in a top view from the first intersection point 19 to the second intersection point 20.

The turning insert 1 according to the second embodiment further differs from the turning insert 1 according to the first embodiment in that the first and second cutting edges 6, 7 are inclined in a side view in relation to the reference plane P2 towards the corner cutting edge 5, as seen in e.g. FIG. 14. More specifically, a distance in a side view from the reference plane P2 to a portion of the first and second cutting edges 6, 7, respectively, is increasing towards the corner cutting edge 5.

In all other substantial aspects, the turning insert 1 according to the second embodiment is similar or identical to the turning insert 1 according to the first embodiment.

Reference is now made to FIGS. 17-20, which show a turning insert 1 according to a third embodiment, which has a general shape and dimensions corresponding to what is commonly known as CNMG 120408. The turning insert 1 comprises a top surface 2, an opposite bottom surface 3 and a side surface 4 connecting the top and bottom surfaces 2, 3. The side surface 4 is a clearance surface. A cutting edge 15 is formed at an intersection of the top surface 2 and the side surface 4. The cutting edge 15 comprises a corner cutting edge 5, a first cutting edge 6 and a second cutting edge 7. The corner cutting edge 5 is convex in a top view, and the radius of curvature of the corner cutting edge 5 is 0.8 mm. A first end of the corner cutting edge 5 and the first cutting edge 6 are connected at a first transition point 8. An opposite second end of the corner cutting edge 5 and the second cutting edge 7 are connected at a second transition point 9. As seen in FIG. 17, a bisector 10 extending equidistantly between the first and second cutting edges 6, 7 intersects a mid-point 11 of the corner cutting edge 5 in a top view. The top surface 2 comprises a first surface 13 in the form of a depression. More specifically, the first surface 13 is a depression in the form of a chute. The chute extends along the bisector 10 from a center of a rear end 14 of the first surface 13 to the mid-point 11 of the corner cutting edge 5. More specifically, a bottom of the chute extends along the bisector 10 from a center of a rear end 14 of the first surface 13 to the mid-point 11 of the corner cutting edge 5. The chute is U-shaped or concave in cross sections in planes perpendicular to the bisector 11.

Thus, the first surface 13 is not a flat surface. In other words, the first surface 13 is not a surface which is located in a singular plane. In the third embodiment, the first surface 13 borders to around 70-90% of the corner cutting edge 5, although it is also possible that the first surface borders to 90-100% of the corner cutting edge 5. As seen in FIG. 17, the first and the second cutting edges 6, 7 in a top view subtend, or form, an angle θ which is 80°.

At least a part of the corner cutting edge 5 is concave in a front view not shown. The first surface 13 extends along the cutting edge 15 by a length defined by a first intersection point 19 and an opposite second intersection point 20. The first and second intersection points 19, 20 are located on opposite sides of the bisector 10.

A shortest distance in a top view between the first and second intersection points 19, 20 is 75-125%, in the third embodiment 75-85%, of a distance in a top view between the first and second transition points 8, 9.

Figure 20:
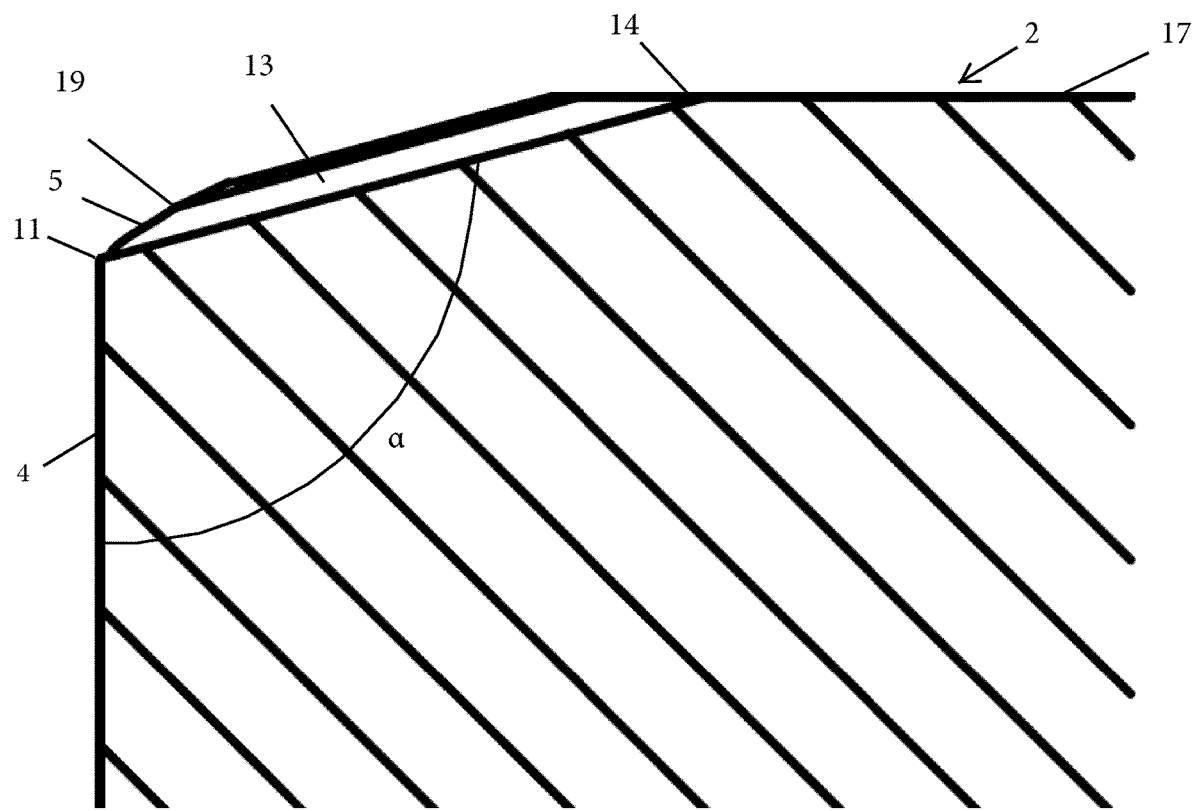
FIG. 20 is a detailed view of section D in FIG. 19.

As seen in FIG. 20, an edge angle α formed between the first surface 13 and the side surface 4, at the mid-point 11 of the corner cutting edge 5, is 90-125°, in the third embodiment it is 100-105°, where the edge angle α is measured in a plane comprising the bisector 10.

The corner cutting edge 5 at the first transition point 8 is tangent or substantially tangent to the first cutting edge 6 in a top view, and the corner cutting edge 5 at the second transition point 9 is tangent or substantially tangent to the second cutting edge 7 in a top view. The first surface 13 is formed in a material comprising cubic boron nitride.

As seen in e.g. FIG. 18, the first surface 13 borders to the first flat surface 17.

The first surface 13 may in the third embodiment be formed by a grinding operation, or by any other suitable material subtractive method.

Figure 21:
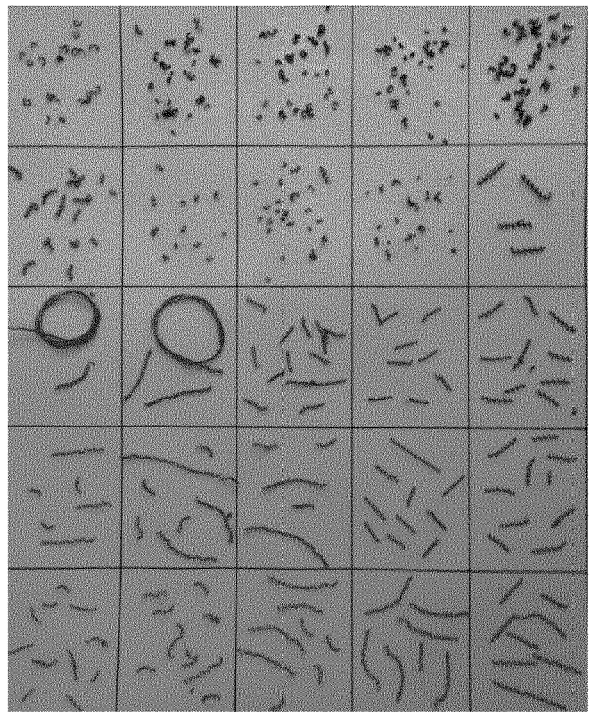
FIG. 21 is a chip chart from a turning insert according to an embodiment.

FIG. 21 is a photo of a chip chart from a turning insert according to an embodiment. The insert has a rhombic basic shape, with an 80° active nose angle. The insert is of the type commonly known as CNMG 120408. The insert has a nose radius of 0.80 mm. The grade is designated GC4225, and is a CVD-coated cemented carbide grade from the company Sandvik Coromant. Tests have been performed by longitudinal turning, i.e. turning with a feed direction parallel to the rotational axis of the metal work piece to be machined. The entering angle during machining is 95°. The active nose of the insert has an 80° nose angle in a top view. Coolant in the form of emulsion at approximately 10 bar has been used. The cutting speed has been 300 m/rev. The metal work piece is a material according to Swedish standard SS 1672. Tests have been performed at different depth of cut, and different feed rates, which is shown in the chip chart in FIG. 21. The columns show different feed rates, where from the left-hand column to the right-hand column, the feed rate, $f_n$, have been 0.08; 0.12; 0.15; 0.20 and 0.40 mm/rev. The rows show different cutting depth, or depth of cut, where from the top row to the bottom row, the depth of cut, $a_p$, have been 1.0; 0.6; 0.4; 0.3 and 0.2 mm. The first surface and the cutting edge of the insert used are similar or identical to the first and the second embodiments.

Figure 22:
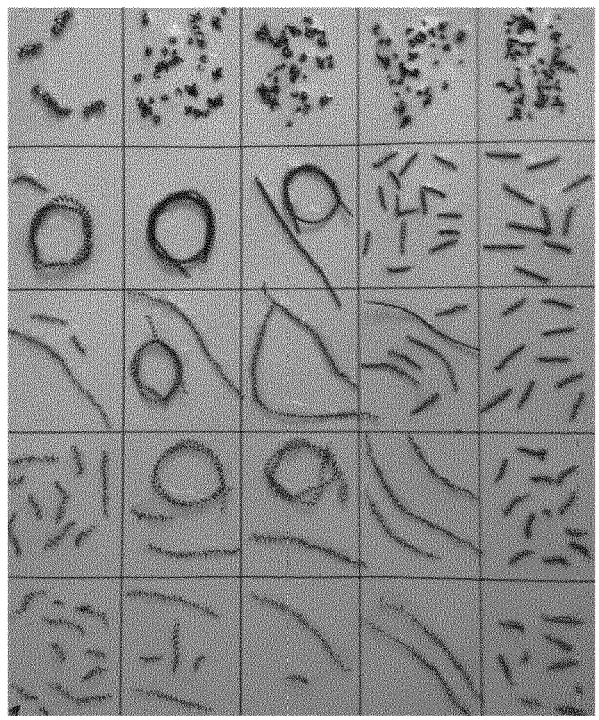
FIG. 22 is a chip chart from a known turning insert.

FIG. 22 is a photo of a chip chart from a known reference turning insert suitable for machining long chipping materials, especially low carbon steels. The insert is designated CNMG 120408 LC GC4225 and is from the company Sandvik Coromant. All parts of the cutting edges of the insert is located in a common plane. The only difference between the chip chart in FIG. 22 compared to FIG. 21 is the geometry of the turning insert. As at least the skilled person can clearly see, the shape and length of the chips cut by the turning insert according to an embodiment, shown in FIG. 21, are clearly shorter and/or have a more advantageous form or shape than the chips cut by the known reference turning insert, shown in FIG. 22. The result of the improved performance can be attributed to the geometrical shape of the turning insert.

Figure 23:
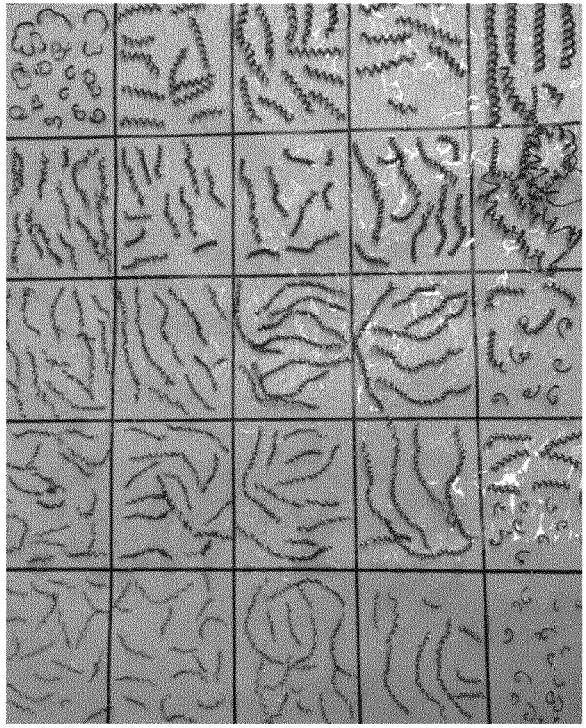
FIG. 23 is a chip chart from the turning insert according to the first embodiment.

FIG. 23 is a photo of a chip chart from turning using a turning insert according to the first embodiment. Thus, the insert is of the CNMG 120408-type. The insert grade is GC4325 from the company Sandvik Coromant. The work piece material is steel specified by the British Standards Institute BSI as BS EN 10025 S355J2. In all other aspects, the test as represented by the chip chart is identical to what has been described with regards to FIG. 21.

Figure 24:
FIG. 24 is a chip chart from a known turning insert.

FIG. 24 is a photo of a chip chart from turning using a known reference turning insert, designated CNMG 120408 PMC GC4325 from the company Sandvik Coromant. In all other aspects, the test which the chip chart represents is identical to what has been described with regards to FIG. 23.

The feed rates and depth of cuts in the columns and rows in FIGS. 23-24 corresponds to those of FIG. 21.

The only difference between the insert according to the first embodiment, used for producing the chip chart in FIG. 23, and the insert CNMG 120408 PMC GC4325, used for producing the chip chart in FIG. 24, is that a first surface in the form of a depression is formed adjacent to the active corner cutting edge. Hence, the improved shape of the chips seen in FIG. 23 compared to FIG. 24 is the sole result of the shape of the insert according to the embodiment.

Figure 25:
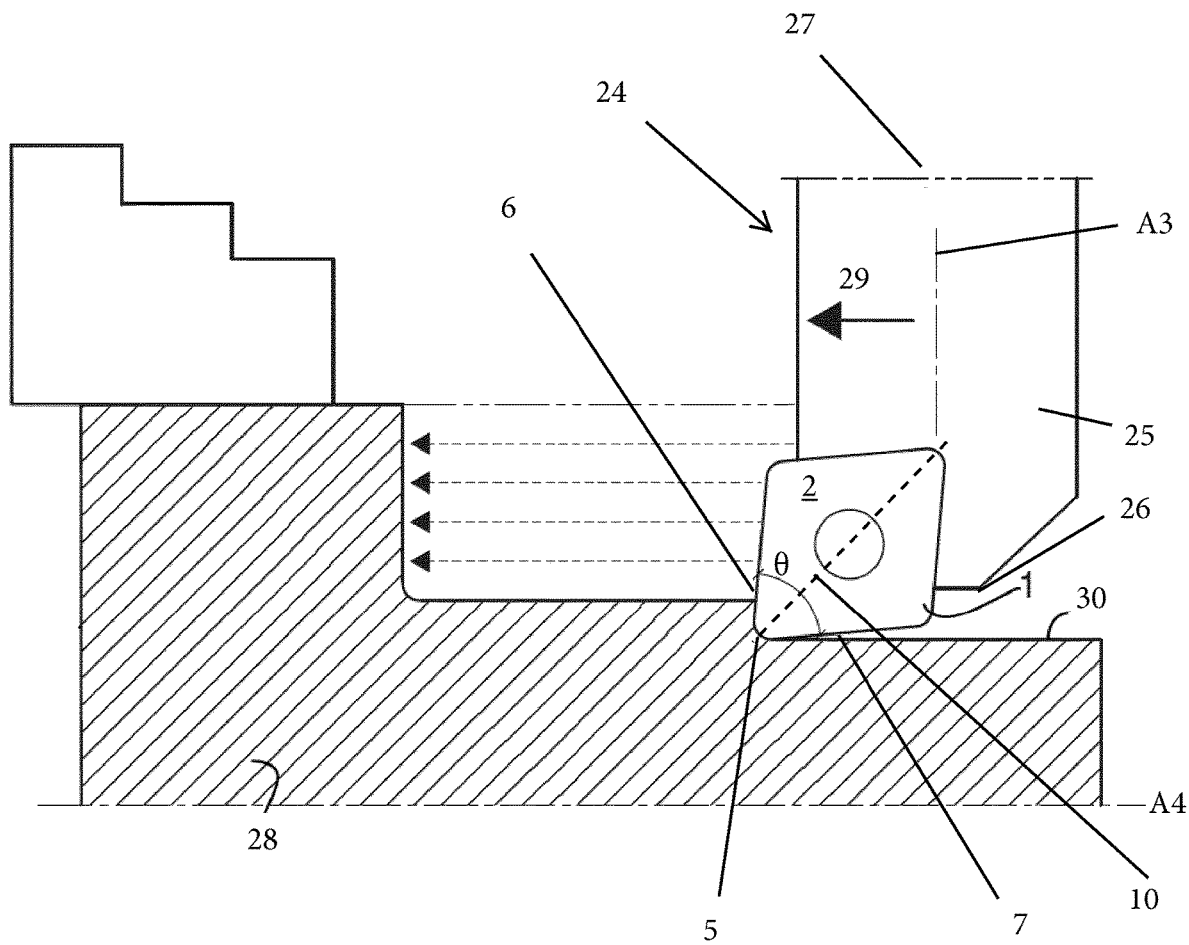
FIG. 25 is a schematic view of a turning operation with a turning tool comprising a turning insert according to an embodiment, where the turning tool comprising the turning insert is seen in a top view.

As illustrated in FIG. 25, a turning tool 24 comprises a tool body 25 and a turning insert 1 according to an embodiment.

The tool body 25 comprises a seat in which the turning insert 1 is mounted, by means of a screw or a clamp not shown. The tool body 25 comprises a front end 26, a rear end 27, and a longitudinal axis A3 intersecting the front 26 and the rear end 27. The bisector 10 extending equidistantly between the first and second cutting edges 6, 7 of the corner cutting edge 5 intersects a mid-point of the corner cutting edge 5 in a top view. Adjacent to the corner cutting edge is a first surface in the form of a depression (not shown). The first and the second cutting edges 6, 7 in a top view subtends an angle θ which is 75-85°, in FIG. 25 the angle θ is 80°. The bisector 10 in a top view forms an angle of 40-50° relative to the longitudinal axis A3 of the tool body 25.

The tool body 26 is made at least partly from a softer material than the turning insert 1, preferably steel.

The rear end 27 of the tool body is suitable to be clamped in or coupled to a machine tool such as a computer numerical control CNC lathe. In a cross section perpendicular to the longitudinal axis A3, the tool body 26 in FIG. 25 have a square or rectangular shape, e.g. a square where the sides of the square having a length of 25 mm. Alternatively, the tool body 25 including the rear end 27 thereof may comprise a coupling, suitable to be coupled to a machine tool, which is substantially rotationally symmetrical around the longitudinal axis A3, such as the coupling according to ISO/DIS 26623 standard, e.g. Coromant Capto. The longitudinal axis A3 is preferably arranged perpendicular to a rotational axis A4 of the metal work piece 28 during machining. The bisector 10 intersecting the mid-point of the active corner cutting edge 5, i.e. the corner cutting edge 5 which is at the greatest distance from the rear end 27 of the tool body 25, in a top view, i.e. where the top surface 2 of the turning insert 1 is facing the viewer, forms an angle of 40-50° relative to the longitudinal axis A3 of the tool body 25.

When the turning insert 1 is mounted in the seat of the tool body 25, the first cutting edge 6 is arranged to form an entering angle, i.e. an angle between the feed direction 29 and the first cutting edge 6, of 92-98°. The second cutting 7 edge is arranged to form a clearance angle 2-8°. The machined surface 30 is formed by the corner cutting edge 5. The machined surface 30 is a rotationally cylindrical surface in the form of a cylindrical surface, or a surface located at a constant distance from the rotational axis A4. In FIG. 25, the depth of cut is relatively large, and the first cutting edge 6 is active. It is preferable that the depth of cut is smaller, such that the first cutting edge 6 is inactive. In other words, preferably only the corner cutting edge 5 is active.

The process to machine the metal work piece 28 using the above described turning tool 24 can be described as:

rotating the metal work piece 28 a rotational axis A4;
positioning the longitudinal axis A3 of the tool body 25 perpendicular to the rotational axis A4 of the metal work piece 28;
moving the turning tool 24 in a feed direction 29 parallel to the rotational axis A4 such that a machined surface 30 of the metal work piece 28, parallel to the rotational axis A4 of the metal work piece 28, is formed by the corner cutting edge 5.

The process can include only a single pass. Alternatively, the process may comprise multiple passes, as illustrated by the horizontal arrows in FIG. 25. The metal work piece is preferably steel. Preferably the process comprises the step of setting the depth of cut to equal or less than the nose radius of the corner cutting edge.

Tool life tests have been performed using CNMG 120408-type turning inserts in grade GC4325 from the company Sandvik Coromant. This insert has a nose radius or corner radius of 0.80 mm. The work piece material was the bar steel which is according to Swedish standard SS 1672. Cutting data in longitudinal turning was cutting speed 500 m/minute, feed 0.20 mm/revolution, depth of cut 0.45 mm. Flood coolant using emulsion was used at 70 bar pressure. A reference turning insert having a corner cutting edge which is located in a plane parallel to a reference plane was used, the reference insert was CNMG 120408 PM GC4325 from the company Sandvik Coromant. A further 9 turning inserts was used, including the inserts according to the first and second embodiments. All of the further 9 turning inserts has a shape such that at least a part of the corner cutting edge is concave in a front view, the first surface is a depression, the first surface extends along the cutting edge by a length defined by a first intersection point and an opposite second intersection point, the first and second intersection points are located on opposite sides of the bisector, and a shortest distance in a top view between the first and second intersection points is 75-125% of a distance in a top view between the first and second transition points. In the tool life test, where tool life was set to a predetermined amount of flank wear, around 0.2 to 0.3 mm, all the further 9 insert did perform equal or better than the reference insert. The tool life increase for the turning insert according to the first embodiment compared to the reference turning insert was around 75%.

Further tool life tests were performed where the only difference was that the depth of cut was increased to 2.0 mm. The result from these further tool life tests were mixed, and on average the further 9 turning inserts achieved approximately the same tool life as the reference turning insert.

The conclusion is that from a tool life perspective, an increase of tool life in turning steel with turning insert according to embodiments can be expected at cutting depths which is equal to or preferably less than the nose radius of the active corner cutting edge of the turning insert.

Although the embodiments described above have been of the general shape or dimension commonly known as CNMG 120408, other shapes of inserts are possible. For example, WNMG-type inserts are possible, where the top surface comprises three 80° corners in a top view. Also other types of turning inserts are possible. For example, single sided, or positive, turning inserts are possible, such as CCMT-type turning inserts.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. Terms such as "upper", "lower", "top", "bottom", "forward" and "rear" refer to features as shown in the current drawings and as perceived by the skilled person.

The invention claimed is:

1. A turning insert comprising:
a top surface and an opposed bottom surface;
a side surface connecting the top and bottom surfaces;
a cutting edge formed at an intersection between the top surface and the side surface, the cutting edge including a corner cutting edge, a first cutting edge and a second cutting edge, wherein the corner cutting edge is convex in a top view, wherein a first end of the corner cutting edge and the first cutting edge are connected at a first transition point, and wherein an opposite second end of the corner cutting edge and the second cutting edge are connected at a second transition point; and
a bisector extending equidistantly between the first and second cutting edges, the bisector intersecting a mid-point of the corner cutting edge in a top view, wherein the top surface includes a first surface, wherein the first surface borders to at least a major portion of the corner cutting edge, wherein an edge angle formed between the first surface and the side surface at the mid-point of the corner cutting edge is 65-95°, the edge angle being measured in a plane containing the bisector and intersecting the side surface, wherein the top surface includes two identical first surfaces, wherein the first surface is concave when viewed in a plane containing the bisector, wherein the turning insert includes at least 99% cemented carbide or at least 99% cermet, and wherein the first surface is formed by pressing and sintering, the first and the second cutting edges in a top view subtending an angle, which is 75-85°, wherein at least a part of the corner cutting edge is concave in a view from the side surface in a direction of the bisector, wherein the first surface is a depression, the first surface being bordered by the cutting edge along a length defined by a first intersection point and an opposite second intersection point, the first and second intersection points being located on opposite sides of the bisector, wherein a shortest distance in a top view between the first and second intersection points is 75-125% of a distance in a top view between the first and second transition points.

2. The turning insert according to claim 1, wherein the mid-point of the corner cutting edge is at a lowermost point of the corner cutting edge.

3. The turning insert according to claim 1, wherein an edge angle formed between the first surface and the side surface at the mid-point of the corner cutting edge is less than 110°, the edge angle being measured in a plane including the bisector.

4. The turning insert according to claim 1, wherein the first surface is formed as a depression that is deeper along the bisector than perpendicular to the bisector.

5. The turning insert according to claim 1, wherein the corner cutting edge and the first surface are symmetrically arranged relative to the bisector.

6. The turning insert according to claim 1, wherein a distance from the first intersection point to the first transition point in a top view is less than 20% of a distance between the first and second transition points in a top view, wherein a distance from the second intersection point to the second transition point in a top view is less than 20% of a distance between the first and second transition points in a top view.

7. The turning insert according to claim 1, wherein at least a majority of the first surface is concave as seen in cross-section in a plane perpendicular to the bisector from the mid-point of the corner cutting edge towards a first surface rear end.

8. The turning insert according to claim 1, wherein the first cutting edge includes a first convex cutting edge portion adjacent to the first intersection point, wherein the second cutting edge includes a second convex cutting edge portion adjacent to the second intersection point.

9. The turning insert according to claim 1, wherein the first surface is bordered by a first surface front end defined by the cutting edge between the first intersection point and the opposite second intersection point and an opposite first surface rear end, wherein in a top view a distance from the mid-point of the corner cutting edge to a center of the first surface rear end is 25-150% of a distance in a top view from the first intersection point to the second intersection point, wherein the corner cutting edge has a radius of curvature in top view which is 0.2-2.0 mm, wherein a distance in a top view between the mid-point of the corner cutting edge to a center of the first surface rear end is at least 25% and less than or equal to 150% of the radius of curvature of the corner cutting edge in a top view.

10. The turning insert according to claim 1, wherein the corner cutting edge has a constant or substantially constant radius of curvature in a top view, wherein said radius of curvature is 0.2-2.0 mm, wherein in a front view, at least a portion of the corner cutting edge has a constant or substantially constant second radius of curvature around a longitudinal axis, wherein the second radius of curvature is 150-250% of the radius of curvature of the corner cutting edge in a top view, wherein the bisector and the longitudinal axis are located in a common plane, wherein the bisector and the longitudinal axis coincide in a top view, wherein a reference plane extends equidistantly between the top and bottom surfaces, wherein the top surface includes a first flat surface extending parallel to the reference plane, wherein the mid-point of the corner cutting edge and the longitudinal axis are located on opposite sides of a plane containing the first flat surface.

11. The turning insert according to claim 1, wherein a reference plane extends equidistantly between the top and bottom surfaces, wherein a shortest distance from the mid-point of the corner cutting edge to the reference plane is less than a shortest distance from the first transition point to the reference plane, wherein a shortest distance from the mid-point of the corner cutting edge to the reference plane is less than a shortest distance from the second transition point to the reference plane.

12. The turning insert according to claim 1, wherein the turning insert in a top view is shaped as a parallelogram or a rhomboid or a polygon, wherein the top surface in a top view includes two or three acute angled corners, wherein the top surface and the bottom surface are identical, wherein a central through hole intersects the top surface and the bottom surface, wherein the central through hole extends along a center axis of the turning insert, wherein the first and second cutting edges are straight in a top view, wherein a reference plane extends equidistantly between the top and bottom surfaces, wherein the center axis of the turning insert is perpendicular to the reference plane, the first and second cutting edges extending to transition points formed at adjacent corners, wherein the top surface includes a first flat surface parallel to the reference plane, wherein the bottom surface includes a second flat surface parallel to the reference plane, wherein a shortest distance from the reference plane to the first flat surface is greater than a shortest distance from the reference plane to the cutting edge, wherein the corner cutting edge in a top view is shaped as an arc of a circle with a radius of 0.2-2.0 mm, a shortest distance from the center axis of the turning insert to the mid-point of the corner cutting edge being greater than a shortest distance from the center axis of the turning insert to the first cutting edge, wherein a shortest distance from the center axis of the turning insert to the mid-point of the corner cutting edge is greater than a shortest distance from the center axis $A1$ of the turning insert to the second cutting edge, the top surface including an inclined surface, wherein the first surface and the inclined surface are spaced apart, wherein at least a portion of the inclined surface is elevated in relation to the cutting edge, wherein a distance from the corner cutting edge to a bottom portion of the inclined surface is shorter than a distance from the corner cutting edge to a top portion of the inclined surface, and wherein the turning insert including the first surface, is made from cemented carbide or cermet.

13. A turning tool comprising:
   a turning insert according to, claim 1; and
   a tool body including a seat in which the turning insert is mountable, a front end, a rear end, and a longitudinal axis intersecting the front and the rear ends, wherein the bisector intersecting the mid-point of the active corner cutting edge in a top view forms an angle of 40-50° relative to the longitudinal axis of the tool body.

* * * * *